(12) United States Patent
Cajigas et al.

(10) Patent No.: US 9,311,883 B2
(45) Date of Patent: Apr. 12, 2016

(54) RECALIBRATION OF A FLEXIBLE MIXED REALITY DEVICE

(75) Inventors: Elmer S. Cajigas, Sammamish, WA (US); Paul M. O'Brien, Sammamish, WA (US); Andras Tantos, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 269 days.

(21) Appl. No.: 13/294,825

(22) Filed: Nov. 11, 2011

(65) Prior Publication Data
US 2013/0120224 A1     May 16, 2013

(51) Int. Cl.
*G09G 5/00*     (2006.01)
*G06F 3/01*     (2006.01)
*G02B 27/01*     (2006.01)

(52) U.S. Cl.
CPC ................ *G09G 5/00* (2013.01); *G02B 27/017* (2013.01); *G06F 3/012* (2013.01); *G06F 3/013* (2013.01); *G02B 2027/014* (2013.01); *G02B 2027/0138* (2013.01); *G02B 2027/0178* (2013.01); *G02B 2027/0187* (2013.01)

(58) Field of Classification Search
CPC ..... G06F 3/012; G06T 7/0075; G06T 7/0018; G06T 7/002
USPC ............... 345/8, 156, 419, 629, 633; 715/848
See application file for complete search history.

(56) References Cited

U.S. PATENT DOCUMENTS

| | | | | |
|---|---|---|---|---|
| 4,952,024 | A | * | 8/1990 | Gale ............................. 359/477 |
| 5,696,521 | A | * | 12/1997 | Robinson et al. .................. 345/8 |
| 5,701,154 | A | * | 12/1997 | Dasso ............................. 348/42 |
| 6,195,206 | B1 | * | 2/2001 | Yona et al. ..................... 359/630 |
| 6,753,828 | B2 | | 6/2004 | Tuceryan et al. |
| 6,891,518 | B2 | | 5/2005 | Sauer et al. |
| 7,350,919 | B2 | * | 4/2008 | Hillis et al. ................... 351/205 |
| 7,369,101 | B2 | | 5/2008 | Sauer et al. |
| 7,542,051 | B2 | | 6/2009 | Matsui et al. |

(Continued)

OTHER PUBLICATIONS

Billinghurst, et al., "Collaborative Mixed Reality," Proceedings of the First International Symposium on Mixed Reality held on Mar. 9-11, 1999 in Yokohama, Japan, Mixed Reality—Merging Real and Virtual Worlds, Jun. 1999, pp. 261-284, Springer Verlag, Berlin, Germany, 16 pages.

(Continued)

*Primary Examiner* — Calvin C Ma
(74) *Attorney, Agent, or Firm* — Micah Goldsmith; Judy Yee; Micky Minhas

(57) ABSTRACT

The technology provides embodiments for recalibration of outward facing cameras supported by a see-through, head mounted, mixed reality display system having a flexible portion between see-through displays for the eyes. Each outward facing camera has a fixed spatial relationship with a respective or corresponding see-through display positioned to be seen through by a respective eye. For front facing cameras, the fixed spatial relationship allows a predetermined mapping between positions on an image sensor of each camera and positions on the respective display. The mapping may be used to register a position of a virtual object to a position of a real object. A change in a first flexible spatial relationship between the outward facing cameras can be automatically detected. A second spatial relationship between the cameras is determined. A registration of a virtual object to a real object may be updated based on the second spatial relationship.

20 Claims, 15 Drawing Sheets

(56) References Cited

U.S. PATENT DOCUMENTS

| | | | |
|---|---|---|---|
| 7,554,511 B2* | 6/2009 | Fager et al. | 345/7 |
| 8,502,864 B1* | 8/2013 | Watkins | 348/52 |
| 2006/0072206 A1* | 4/2006 | Tsuyuki et al. | 359/631 |
| 2008/0266386 A1 | 10/2008 | Maeda | |
| 2008/0292131 A1 | 11/2008 | Takemoto et al. | |
| 2010/0103175 A1 | 4/2010 | Okutomi et al. | |
| 2011/0213664 A1* | 9/2011 | Osterhout et al. | 705/14.58 |

OTHER PUBLICATIONS

Gibson, "Initial Calibration in Factory," Spatial calibration of an optical see-through head mounted display, Power Point, 2008, 2 pages. (Believe Gilson was meant rather than Gibson).

Gilson, et al., "Spatial calibration of an optical see-through head mounted display," Department of Physiology, Anatomy and Genetics, Oxford, United Kingdom, May 21, 2008, 25 pages.

Kato et al., "Marker Tracking and HMD Calibration for a Video-based Augmented Reality Conferencing System," Proceedings of the 2nd IEEE and ACM International Workshop on Augmented Reality, Oct. 20-21, 1999, San Francisco, CA, USA, pp. 85-94, 10 pages.

McGarrity et al., "A Method for Calibrating See-through Head-mounted Displays for AR," Proceedings of the 2nd IEEE and ACM International Workshop on Augmented Reality, Oct. 20-21, 1999, San Francisco, CA, USA, 10 pages.

Photogrammetry, Wikipedia, the free encyclopedia [online], [retrieved on Aug. 19, 2011] Retrieved from the Internet: <URL:http://en.wikipedia.org/wiki/Photogrammetry>, 3 pages.

Ramu et al., "A Flexure-based Deployable Stereo Vision Mechanism and Temperature and Force Sensors for Laparoscopic Tools," 14th National Conference on Machines and Mechanisms, Dec. 17-18, 2009, Durgapur, India, pp. 440-445, 6 pages.

Tuceryan, et al., "Single point active alignment method (SPAAM) for optical see-through HMD calibration for AR," IEEE and ACM International Symposium on Augmented Reality, Oct. 2000, pp. 149, 10 pages.

Uchiyama, et al., "MR Platform: A Basic Body on Which Mixed Reality Applications Are Built," Proceedings of the 1st International Symposium on Mixed and Augmented Reality, ISMAR '02, Sep. 30-Oct. 1, 2002, 8 pages. Retrieved from the Internet: [retrieved on Nov. 10, 2011] <URL:http://www.rm.is.ritsumei.ac.jp/~tamura/paper/ismar2002.pdf>.

Wang, et al., "Tracking a head-mounted display in a room-sized environment with head-mounted cameras," Proceedings of SPIE Helmut-Mounted Displays II, Oct. 1990, vol. 1290, pp. 47-57, 11 pages. Retrieved from the Internet: [retrieved on Nov. 10, 2011] <URL: http://citeseer.ist.psu.edu/viewdoc/summary?doi=10.1.1.35.3451>.

* cited by examiner

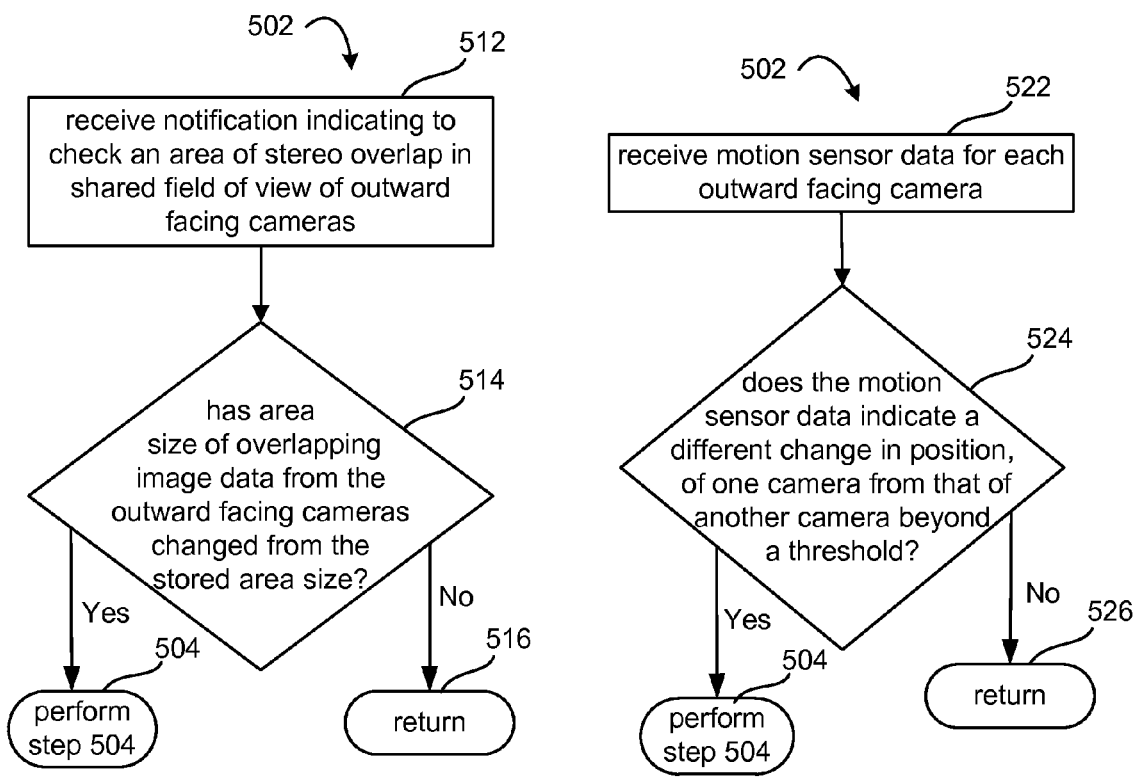
FIG. 6A
FIG. 6B
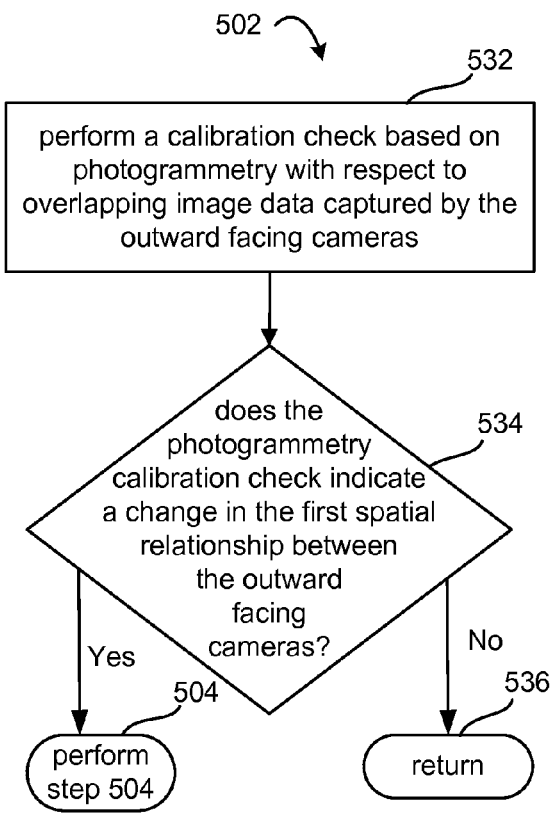
FIG. 6C

RECALIBRATION OF A FLEXIBLE MIXED REALITY DEVICE

BACKGROUND

Mixed reality, also sometimes referred to as augmented reality, is a technology that allows virtual imagery to be mixed with a user's actual view of the real world. A see-through, head mounted, display device may be worn by a user to view the mixed imagery of virtual and real objects. Often a virtual object is registered to a real object meaning the position of the virtual object changes with the position of the real object. Real objects and their positions may be identified from image data captured by one or more cameras mounted on the display device. A one time calibration which defines a transformation from respective camera coordinates to respective display coordinates is typically performed before the see-through, mixed reality, head mounted, display is considered operational, e.g. at the factory before shipment. For rigid mixed reality display devices, a one time calibration may suffice.

SUMMARY

The technology provides one or more embodiments for recalibration of a see-through, head mounted, mixed reality display system having a flexible portion between see-through displays for the eyes. The mixed reality display system includes a real environment facing camera for each eye. The cameras are also referred to as outward facing cameras meaning facing outward from the user's head. Each outward facing camera has a fixed spatial relationship with respect to a respective see-through display for each eye. The fixed spatial relationship may be maintained by a rigid frame portion supporting the respective camera and its corresponding see-through display. If a camera moves, its corresponding see-through display moves.

The outward facing cameras typically include front facing cameras meaning they are attached to the front of the display device and face what is in front of the user so the field of view of the front facing cameras overlaps with the field of view of the user when looking through the display device. For front facing cameras, the fixed spatial relationship provides for a fixed mapping of image data of a real object at a position on an image sensor of a front facing camera to a position on a corresponding see-through display. By detecting a change in a spatial relationship between the front facing cameras, the change in the spatial relationship can be determined, and a change in the position of the real object as seen through the display can be automatically detected. A position of any virtual object which is dependent on the position of the real object is updated.

The technology provides an embodiment of a method of recalibrating a see-through, head mounted, mixed reality display system having a flexible frame portion between the see-through displays. The method comprises detecting a change in a first spatial relationship between outward facing cameras supported by the see-through, head mounted, mixed reality display system. Each outward facing camera has a fixed spatial relationship with respect to a respective see-through display for each eye. The method further comprises determining a second spatial relationship between the outward facing cameras based on the change in the first spatial relationship between the outward facing cameras. Processing of image data is automatically updated based on the second spatial relationship. An example of such image processing is updating of a registration between a position of a real object and a position of a virtual object. Another example is updating positions of real objects in a three dimensional mapping of the user's surroundings.

The technology provides an embodiment of a see-through, head mounted, mixed reality display system comprising a frame including a flexible frame portion positioned between see-through displays positioned in the frame and outward facing cameras supported by the frame. Each see-through display is positioned in the frame to be seen through by a respective eye. Each outward facing camera being for capturing image data of a real object in a field of view of the respective see-through display and having a fixed spatial relationship with respect to its respective see-through display. The fixed spatial relationship provides for a fixed mapping between image sensor coordinates and display coordinates. The outward facing cameras have a first spatial relationship, and a memory stores the first spatial relationship and image data of the real object. The system further comprises one or more processors having access to the memory and being communicatively coupled to the cameras and displays. The one or more processors automatically updates a registration between a position of the real object and a position of a virtual object responsive to a change in the first spatial relationship between the outward facing cameras.

The technology provides one or more processor readable storage devices having instructions encoded thereon which, when executed, cause one or more processors to perform a method of recalibrating a see-through, head mounted, mixed reality display system having a flexible frame portion between see-through displays. The method comprises automatically detecting a change in a first spatial relationship between outward facing cameras supported by the see-through, head mounted, mixed reality display system. Each outward facing camera has a fixed spatial relationship with respect to a corresponding see-through display. The fixed spatial relationship provides a fixed mapping from image sensor position coordinates to position coordinates on the corresponding see-through display. The method further comprises determining a second spatial relationship between the outward facing cameras based on photogrammetry with respect to overlapping image data captured by the outward facing cameras and a scale based on a predetermined geometrical measurement in a field of view of the outward facing cameras. Based on the determined second spatial relationship, a registration between a position of a real object and a position of a virtual object on at least one see-through display is updated.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 6A illustrates an embodiment of a process for automatically detecting a change in a first spatial relationship between real environment facing or outward facing cameras of the display device based on image data.

FIG. 6B illustrates another embodiment of a process for automatically detecting a change in a first spatial relationship between real environment facing or outward facing cameras of the display device based on motion sensor data.

FIG. 6C illustrates yet another embodiment of a process for automatically detecting a change in a first spatial relationship between real environment facing or outward facing cameras of the display device based on photogrammetry with respect to overlapping image data captured by the outward facing cameras.

DETAILED DESCRIPTION

The technology provides embodiments for a mixed reality display device with a flexible frame portion, but also with a fixed spatial relationship between a respective outward facing camera and a see-through, mixed reality display for each eye. For example, each outward facing camera and its corresponding display, also referred to as a camera and display set, may be supported by a rigid portion of the frame. A flexible frame portion such as a flexible nose bridge allows each camera and display set to move. Due to the fixed spatial relationship, if the camera moves, its corresponding see-through display moves in the same way. An image sensor also has a predetermined position and orientation within the camera. The outward facing cameras typically include front facing cameras which share a field of view with the see-through displays. The fixed spatial relationship between each front facing camera and display set allows for a predetermined mapping between positions on the image sensor (e.g. sensing elements) and see-through display positions or coordinates. This predetermined mapping is a basis for tracking a position of a virtual object to a real object on the display.

Although each camera and see-through display set may move and maintain a fixed spatial relationship, the movement does change the spatial relationship of the display to the eye, as well as the spatial relationship of the camera to the eye. By tracking rotational and translational changes, virtual object image data can be updated to appear from the perspective of the user's eye which did not change position in the user's head. Translational changes between the cameras are typically on the order of millimeters, and rotational changes are typically on the order of less than five (5) degrees.

In the embodiments illustrated below, the mixed reality display device includes see-through displays within the frame and outward facing cameras positioned with respect to the frame for a predetermined offset relationship with reference points on the see-through displays. An example of a reference point is an optical axis of a see-through display which typically intersects about the center of the display. With the predetermined offset to the reference points, the field of view of the mixed reality display device can be determined based on the image data captured from the outward facing cameras. Front outward facing cameras typically point in a front direction parallel to the optical axes of the display system for approximating the field of view of the display system. Cameras may also be placed pointing in other directions, for example, to provide peripheral vision or a mapping of the surrounding environment of the user.

Figure 1A:
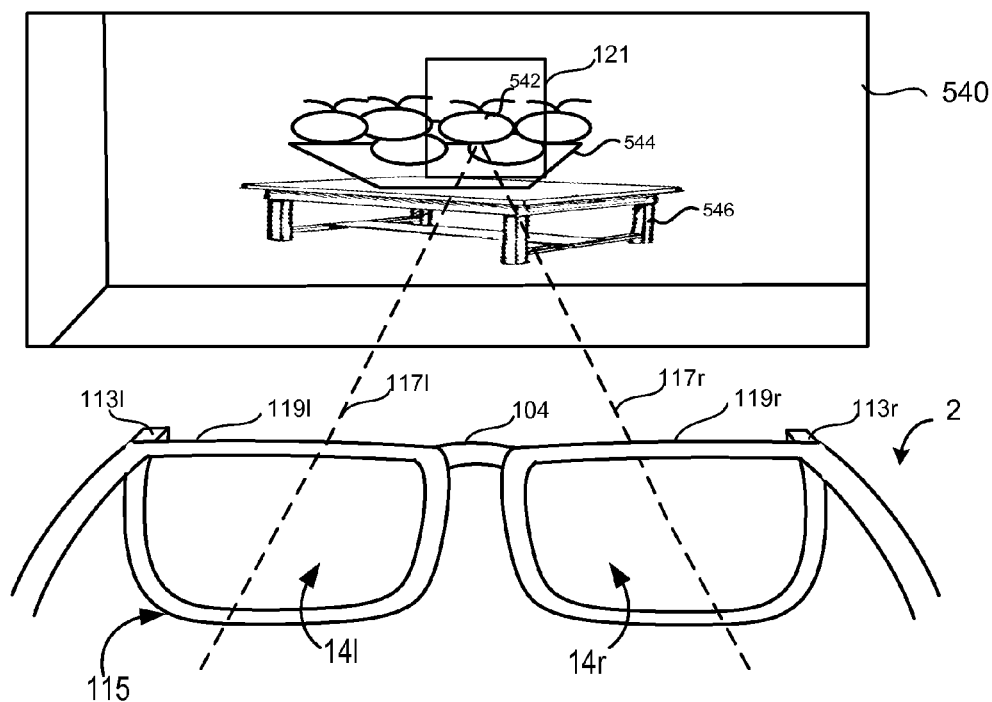
FIG. 1A illustrates an example of image data of a virtual object registered to a real object when viewed through a mixed reality display device calibrated for initial camera and display positions.

FIG. 1A illustrates an example of image data of a virtual object registered to a real object when viewed through a mixed reality display device calibrated for initial camera and display positions. The mixed reality display device 2 includes a frame 115 supporting a display 14 for each eye, left 14*l* and right 14*r*, which projects image data of one or more virtual objects towards a respective user eye. The frame 115 also supports a front facing camera 113 for each eye. As discussed further below, the frame portion 119*l*, 119*r* supporting each display 14 and its respective camera 113 is rigid so the camera and its display have a fixed spatial relationship. However, the frame has a flexible portion, which is nose bridge 104 in this example, which allows the rigid frame portions to move as well as things they include, surround, are attached to, or are otherwise supported by them.

The display view 540 represents what is currently within a field of view of the display device 2. A real table 546 supports a real bowl 544 with real apples 542. In this example, the user is looking straight ahead at the apples 542 in the bowl 546 as represented by eye lines of sight 117l and 117r. Only one of the apples is labeled to avoid overcrowding the drawing. The positions of the real bowl 544, apples 542 and table 546 on an image sensor (not shown) of each camera 113 is identified. The position of these real objects on the respective image sensor is in turn related to their positions in display coordinates for a respective display 14 for each camera 113. A virtual square 121 is surrounding one of the real apples.

Figure 1B:
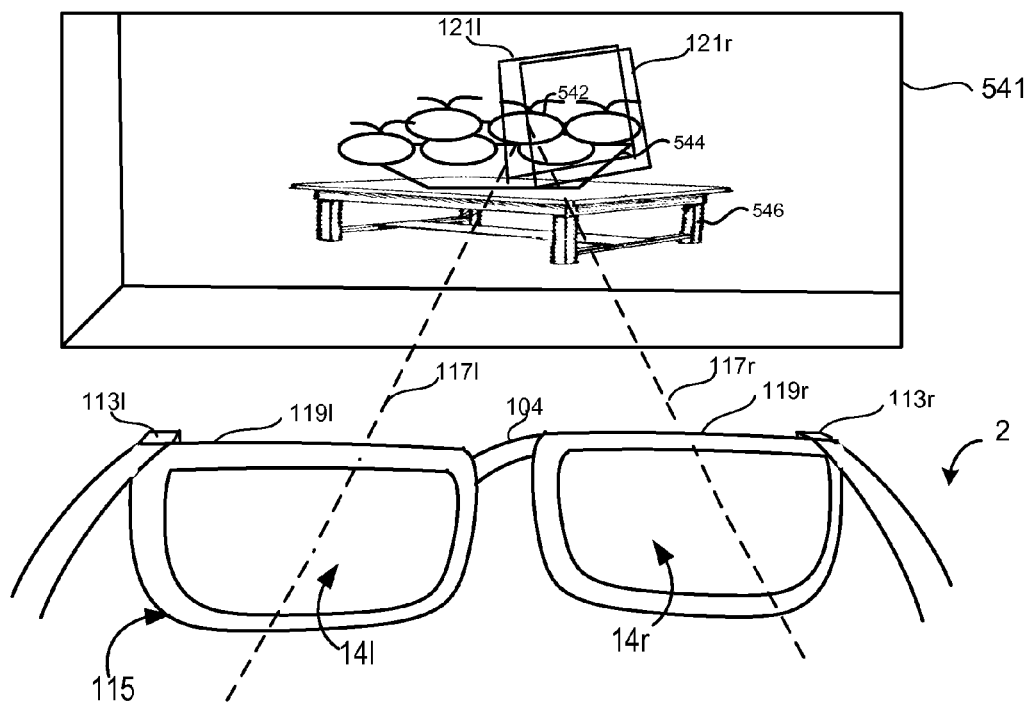
FIG. 1B further illustrates the example of FIG. 1A in which image data of the virtual object has a misaligned registration to the real object when viewed through the mixed reality display device after a calibrated spatial relationship between the cameras has changed.

FIG. 1B further illustrates the example of FIG. 1A in which image data of the virtual object has a misaligned registration to the real object when viewed through a mixed reality display device after a calibrated spatial relationship between the cameras has changed. In FIG. 1B, the flexible nose bridge 104 has shifted in position. The right rigid frame portion 119r has shifted as the nose bridge 104 has translated to the left and up and rotated so that camera 113r is a few mm closer to the apples than nose bridge 104. The camera field of view of 113r has shifted more to the left so the apples have moved from the center of the camera's field of view to the right. Additionally, the left rigid frame portion 119l has translated left and rotated so that the nose bridge 104 is closer to the apples 542 than left camera 113l. In the field of view of the left camera, the apples are more to the right and more of what is to the left of the apples is in view. Additionally, the angle at which the apples are seen has changed due to the rotation away.

As illustrated by the left eye line of sight 117l, now the user's left eye sees the apples 542 in the bowl through the display 14l to the right of the display's center. The left camera 113l is slightly rotated away from the apples. The right camera 113r is slightly rotated toward the apples 542, and has translated left and up. The mapping of the image sensor data to the display coordinates 14l may be used to determine the display coordinates through which the user would see the real object and to which to track the virtual square 121 by taking into account the rotations and translations of the displays 14. Otherwise the registration between the virtual square 121 and the real apple 542 is off or out of alignment. As illustrated in FIG. 1B, each of the virtual squares 121l and 121r projected into the user's eyes now appears further to the right. As the right display 14r has moved up, the apples 542 are tracked to a lower portion of the display, and virtual square 121r for the right eye is displayed lower on the display than the user's right eye sees the apples. Additionally, the rotation of both see-through displays 14 causes the virtual squares to be displayed at angles to the user's eyes presenting a skewed to one side effect as illustrated by the slightly trapezoidal rectangles 121l and 121r.

Figure 1C:
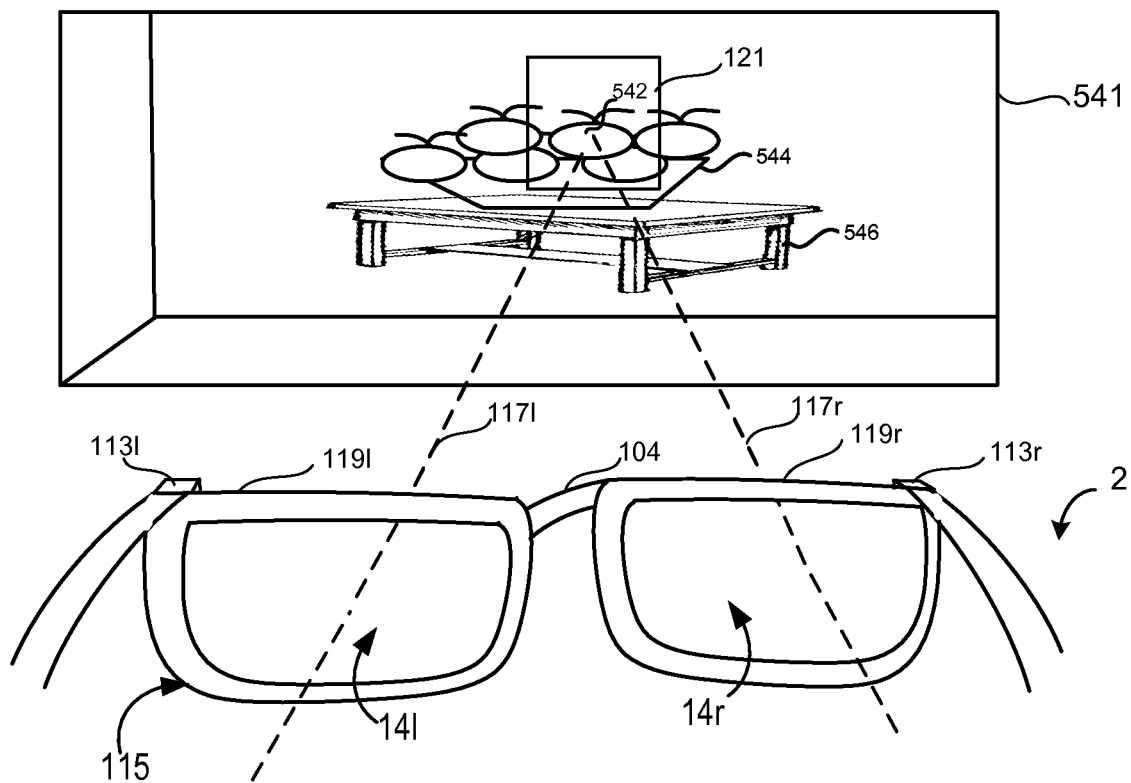
FIG. 1C illustrates that an example of registration being restored between the virtual object and the real object after recalibration.

Recalibration will update the position of the square 121 so that it appears to surround the apple 542 again. FIG. 1C illustrates that an example of registration being restored between the virtual object and the real object after recalibration. In FIG. 1C, executing software determines the new spatial relationship between the displays 14 such as the translation and rotation changes discussed above, and updates the position of the virtual square 121 taking into account the mapping from image sensor to display as well as the translation amounts and directions and the angles of rotation to correct for skew.

FIGS. 1A, 1B and 1C are not drawn to scale.

A see-through display may have a fixed spatial relationship with more than one outward facing camera. One or more cameras 113 may move and change the spatial relationship between cameras which spatial relationship is monitored and recalibrated responsive to a triggering event.

One example of a triggering event, or indicator, triggering recalibration of the mixed reality display is data from one or more motion sensors supported by the frame or cameras for detecting movement of the camera, the see-through display or both. In another example, photogrammetry is applied to overlapping image data captured from the outward facing cameras for checking their spatial relationship, and for determining any change in position of either camera or both. Another example of an event triggering recalibration is user input requesting recalibration.

As previously mentioned, photogrammetry may be used to identify the change in position. Instead of identifying a position of an object captured in image data with respect to cameras at known locations, photogrammetry applied to image data may also be used to identify positions of cameras when a predetermined geometric measurement like a known length in the image data provides a scale.

Figure 2A:
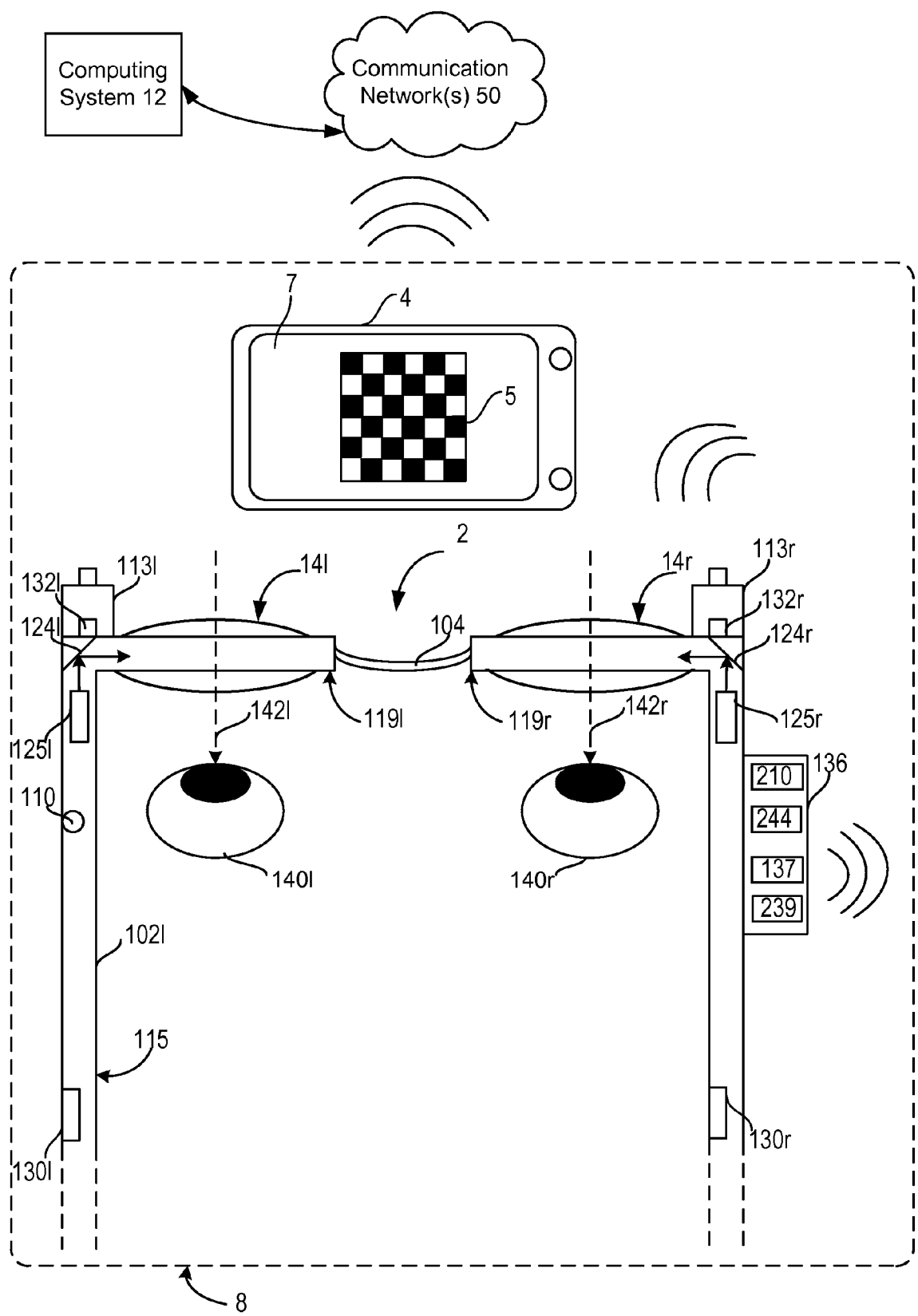
FIG. 2A illustrates an embodiment of a system for recalibrating a see-through, head mounted, mixed reality display system using a predetermined pattern as a real object.

FIG. 2A illustrates an embodiment of a system for recalibrating a see-through, head mounted, mixed reality display system using a predetermined pattern as a real object. System 8 includes a see-through display device as a head mounted, mixed reality, display device 2 in wireless communication with a processing unit 4. In other examples, the display device 2 may have a wired connection to the processing unit 4. In this embodiment, head mounted, display device 2 is in the shape of eyeglasses in a frame 115, with a display optical system 14 for each eye in which image data is projected into a user's eye to generate a display of the image data while a user also sees through the display optical systems 14 for an actual direct view of the real world. The use of the term "actual direct view" refers to the ability to see real world objects directly with the human eye, rather than seeing created image representations of the objects. For example, looking through glass at a room allows a user to have an actual direct view of the room, while viewing a video of a room on a television is not an actual direct view of the room. Each display optical system 14 is also referred to as a see-through display, and the two display optical systems 14 together may also be referred to as a see-through display.

Frame 115 provides a support for holding elements of the system in place as well as a conduit for electrical connections. In this embodiment, frame 115 provides a convenient eyeglass frame as support for the elements of the system discussed further below. The frame 115 includes a rigid portion 119 supporting each see-through display 14 and a front facing camera 113, a flexible nose bridge portion 104 between the rigid portions 119l and 119r, and a temple or side arm 102 for resting on each of a user's ears. In this example, the right temple 102r includes control circuitry 136 for the display device 2 which includes a processing unit 210, a memory 244 accessible to the processing unit 210 for storing processor readable instructions and data, a wireless interface 137 communicatively coupled to the processing unit 210, and a power supply 239 providing power for the components of the control circuitry 136 and the other components of the display 2 like the cameras 113, and image generation units 125. The processing unit 210 may comprise one or more processors including a central processing unit (CPU) and a graphics processing unit (GPU). In other examples, instead of a wireless interface 137, a wired interface can be used.

Mounted to or inside each temple 102 is an image source or image generation unit 125 which produces visible light representing images which are directed to a reflecting surface 124 which directs the visible light into the display optical system 14 which will direct the light representing the image into the respective user eye 140. An example of an image generation unit is a microdisplay projector.

A microphone 110 for recording sounds such as a user voice command requesting recalibration and sending audio data to the processing unit 210 is located on the left temple 102*l* in this embodiment. Each temple 102 includes ear phones 130 for outputting instructions to a user such as requesting the user to focus on an object or pattern with a predetermined geometrical measurement like a length for determining a scale of image data.

On each rigid portion 119 of the frame 115 is an outward facing camera 113 for recording digital images and videos and transmitting the visual recordings to the control circuitry 136 which may in turn send the captured image data to the processing unit 4 which may also send the data to one or more computer systems 12 over a network 50. Each outward facing camera 113 captures image data facing a direction outward from the user's head, in this example front facing. Each camera 113 may capture color information. In some examples, each outward facing camera 113 is also a depth camera which transmits about one or more infrared wavelength and captures infrared reflections, from which depth information may be determined. The processing identifies and maps the user's real world field of view.

In this embodiment, each front facing camera 113 is calibrated with respect to an optical axis 142 of its respective display optical system 14 such that the field of view of the display optical system 14 can be determined from the image data captured by the respective camera 113. For example, left side camera 113*l* is calibrated in a fixed spatial relationship with respect to the optical axis 142*l* of the left eye's 140*l* display optical system 14*l*. The two cameras 113 provide overlapping image data. In some embodiments, depth information for objects in the scene may be determined based on stereopsis.

In this embodiment, each camera 113 includes a motion and orientation sensor unit 132. In some embodiments, the motion and orientation sensor unit 132 may comprise one or more of the following: an inertial measurement unit (IMU), a three axis magnetometer, a three axis gyro, and a three axis accelerometer. Each sensor unit 132 indicates a direction and speed or acceleration of its respective camera. In a state of calibration, the data indicates the cameras move while maintaining a spatial relationship with respect to each other. For example, when the user moves his head position, the data from the sensors indicates the cameras move in the same direction and with the same speed or acceleration thus maintaining their relative positions with respect to each other. Their relative positions may be three-dimensional (3D) positions. In some examples, a request for recalibration can be triggered when the sensor data indicates one or more of the cameras 113 have satisfied a criteria for moving in different directions or at different speeds or at different accelerations.

The frame 115 has both rigid and flexible portions. In this embodiment, the nose bridge 104 is a flexible portion. Some examples of embodiments of the flexible portion 104 include a flexure, a sliding mechanism, a sliding mechanism which locks in any of a number of notches, and a chain. The material can be any flexible material, e.g. paper, plastic, metal, etc. In this example, the temples 102 of the frame and the frame portions 119 surrounding the display optical systems 14 are rigid. The rigidity of these portions of the frame 115 support each camera 113 in the fixed spatial relationship to its respective display optical system 14. In other examples, the temples 102 may be flexible leaving the frame portions 119 rigid to support the cameras and displays in their fixed relationships. A result is a fixed relationship relating image data position of a real object on the image sensor of the front facing camera 113, hereafter referred to as camera coordinates, to the position of the real object in display coordinates. Due to the fixed spatial relationship between the camera coordinates and the display coordinates, a change in the positions of the front facing cameras 113 to one another can be used to approximate a change in the position of the display optical systems 14 with respect to one another. Such a change may involve translational and rotational components.

As mentioned above, image data of a virtual object may be registered to a real object meaning the virtual object tracks its position to a position of the real object in display coordinates when the real object is in the field of view of the see-through displays 14. If the displays 14 and the cameras 113 move with respect to each other, the virtual object will not track its position to the real object any more. Then, the registration will be disrupted. Recalibration of the HMD is performed to correct the registration.

Processing unit 4 may take various embodiments. In some embodiments, processing unit 4 is a separate unit which may be worn on the user's body, e.g. a wrist, or be a separate device like the illustrated mobile device 4 with display 7. Processing unit 4 may communicate wirelessly (e.g., WiFi, Bluetooth, infrared, RFID transmission, wireless Universal Serial Bus (WUSB), cellular, 3G, 4G or other wireless communication means) or via a wired connection over a communication network 50 to one or more computing systems 12 whether located nearby or at a remote location. In other embodiments, the functionality of the processing unit 4 may be integrated in software and hardware components of the display device 2.

An application may be executing on computing system 12 which interacts with or performs processing for display system 8, or may be executing on one or more processors 210 in the see-through, mixed reality display system 8. Examples of hardware and software components of a mobile device 4 such as may be embodied in a smartphone or tablet computing device are described in FIG. 11.

A display 7 of the mobile device 4 may also display data, for example menus, for executing applications and be touch sensitive for accepting user input. The mobile device 4 also provides a network interface for communicating with other computing devices like computing system 12 via a communication network 50 via a wired or wireless communication medium using a wired or wireless communication protocol (e.g. WiFi, Bluetooth, infrared, RFID transmission, WUSB, cellular telecommunication, 3G, 4G or other wireless communication means). A remote network accessible computer system like computing system 12 may be leveraged for processing power and remote data access by a processing unit 4. Some other examples of mobile devices 4 are a smartphone, a laptop, or notebook computer and a netbook computer.

In FIG. 2A, an example of a predetermined pattern is displayed on mobile device 4 as a checkerboard pattern 5. The checkerboard example has a feature of good contrast due to its black and white colors. Image processing software can identify vertices of the squares more easily due to the contrast which makes identifying geometric measurements like lengths easier to detect in sensor data. The checkerboard pattern is also an example of a planar calibration target in that the endpoints of the geometric measurements are in the same plane.

The pattern 5 may also be embodied on a card a person carries or, in other examples, be embodied on a surface of a companion module like processing unit 4, for example on the back cover. In some examples, the processing unit 4 is tethered to the display device 2. For example, the processing unit 4 and the display device 2 may have a wire connection. The particular pattern is a matter of design choice. One or more lengths or other geometric measurements (e.g. angles) for a real object, in this case a checkerboard pattern, is predetermined. The predetermined geometric measurement provides a scale for the image data which scale is a basis for determining a new spatial relationship between the cameras using photogrammetry.

Photogrammetry is used to determine geometric properties of an object from photographic images of the object. However, with a known geometric measurement of a real object in the image, the positions of the cameras 113 capturing the same object can be determined by triangulation. Points on an object with a known geometric measurement between them like a length can be defined in a 2D or 3D coordinate system.

Figure 2B:
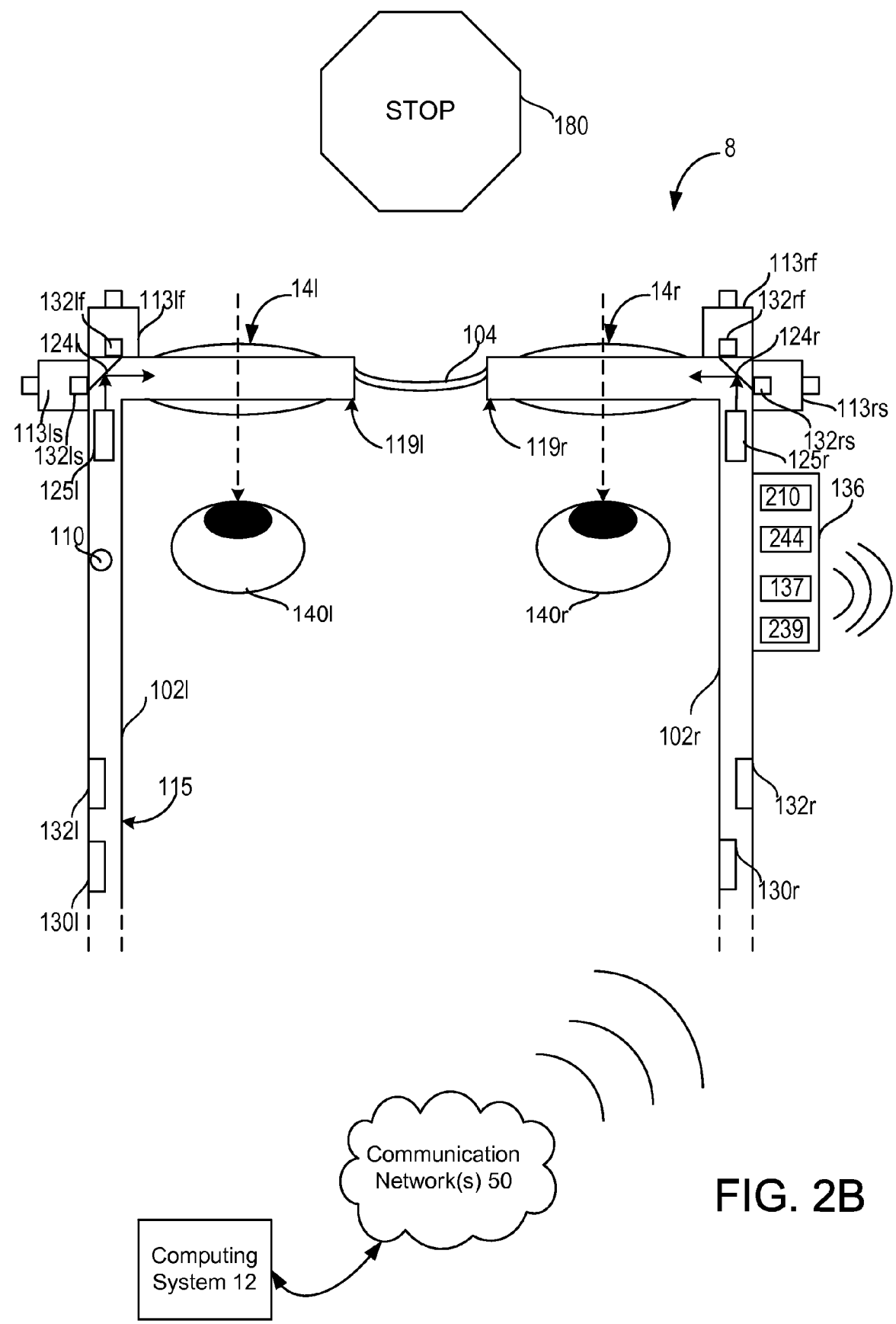
FIG. 2B illustrates an embodiment of a system for recalibrating a see-through, head mounted, mixed reality display system using a standard sized real object.

FIG. 2B illustrates an embodiment of a system for recalibrating a see-through, head mounted, mixed reality display system using a standard sized real object. In this embodiment, the control circuitry 136 performs processing which may have been offloaded to the processing unit 4 in other embodiments and may include additional resources like a larger memory 244 for accommodating that processing. Additionally, the control circuitry 136 communicates directly via a wireless transceiver 137 with a remote computing system 12 over one or more communication networks 50. Furthermore, additional side cameras 113ls and 113rs are illustrated in this embodiment in which they also include one or more motion and orientation sensor units 132, 132ls and 132rs.

The system 8 in FIG. 2B sends image data from at least the two front facing cameras 113lf and 113rf to the remote computing system 12 which performs pattern recognition of the image data to identify any standard sized objects in the image data. As discussed in the example of FIG. 4, the remote computing system 12 has access to a database including image data of standard sized objects for comparisons. FIG. 2B illustrates a stop sign 180 as an example of a standard sized object. The length of each side of the octagon is standard as may be other geometric measurements like a diameter, or perimeter. The stop sign 180 is also an example of a planar calibration target.

Figure 2C:
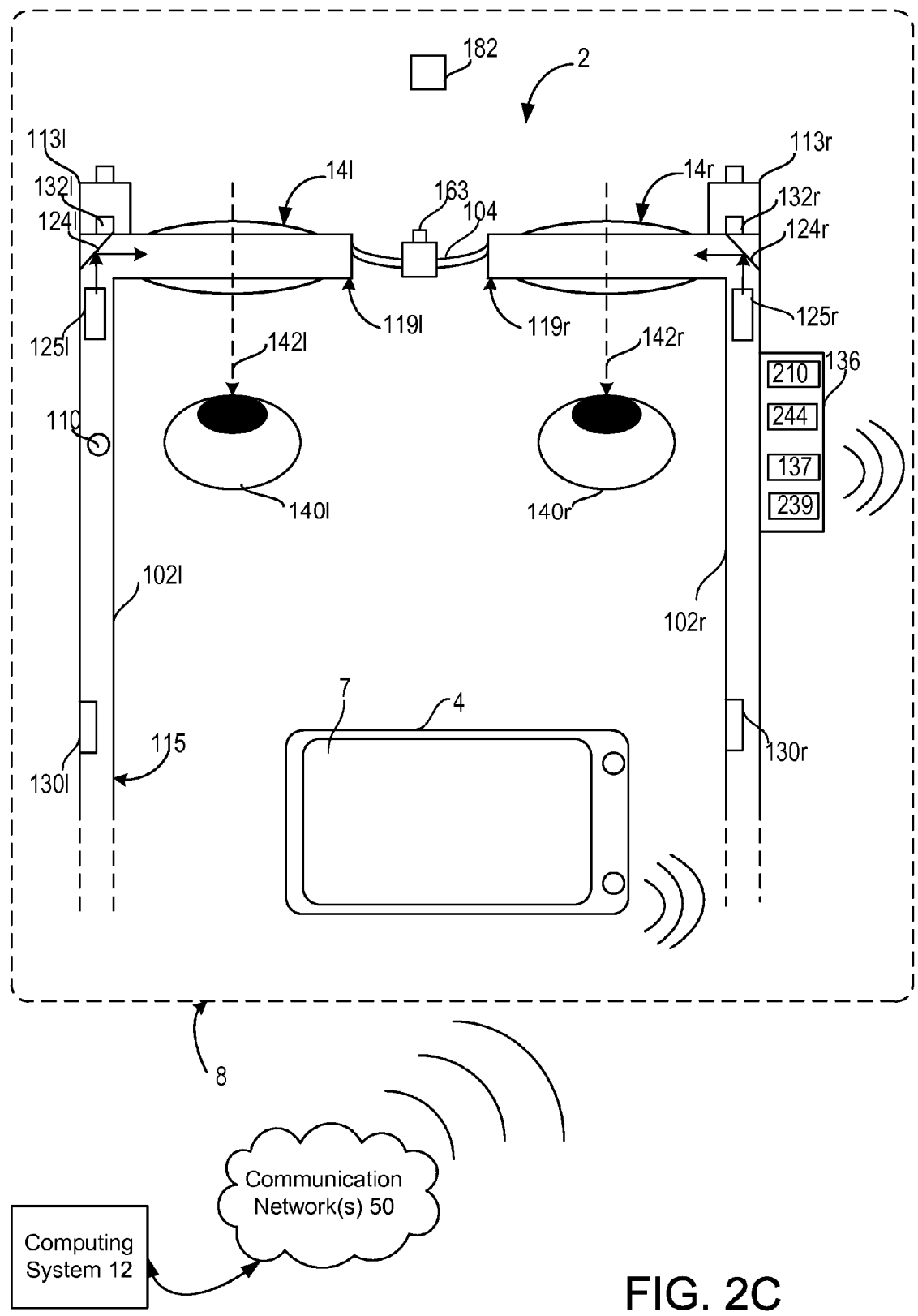
FIG. 2C illustrates an embodiment of a system for recalibrating a see-through, head mounted, mixed reality display system based on a geometrical measurement for a real object determined from depth data.

FIG. 2C illustrates an embodiment of a system for recalibrating a see-through, head mounted, mixed reality display system based on a geometrical measurement for a real object determined from depth data. In this example, the processing unit 4 performs functionality for the system 8, but instead of displaying or having a predetermined pattern on its surface, a real object 182 is detected and measured by a depth camera 163 supported by the frame 115. In this example, the depth camera 163 is supported by the flexible nose bridge 104. The depth camera 163 provides depth data from which three dimensional (3D) measurements can be obtained. Although the flexible nose bridge 104 may move, the accuracy of the depth distance is acceptable in many applications for real objects a meter or so away. For example, a five degree movement of an outward facing camera 113r and display 14 set affects the position of the depth camera 163 on the nose bridge, but for a stop sign 180 three meters away, the depth accuracy is still acceptable, even without accounting for the five degree angle.

As mentioned above, the outward facing cameras 113 may also include depth cameras and they may provide depth data as well for determining depth distances. As the rotational or angular changes are typically small, less than five degrees, the depth measurements based on their depth data typically have acceptable accuracy for photogrammetry.

Figure 3:
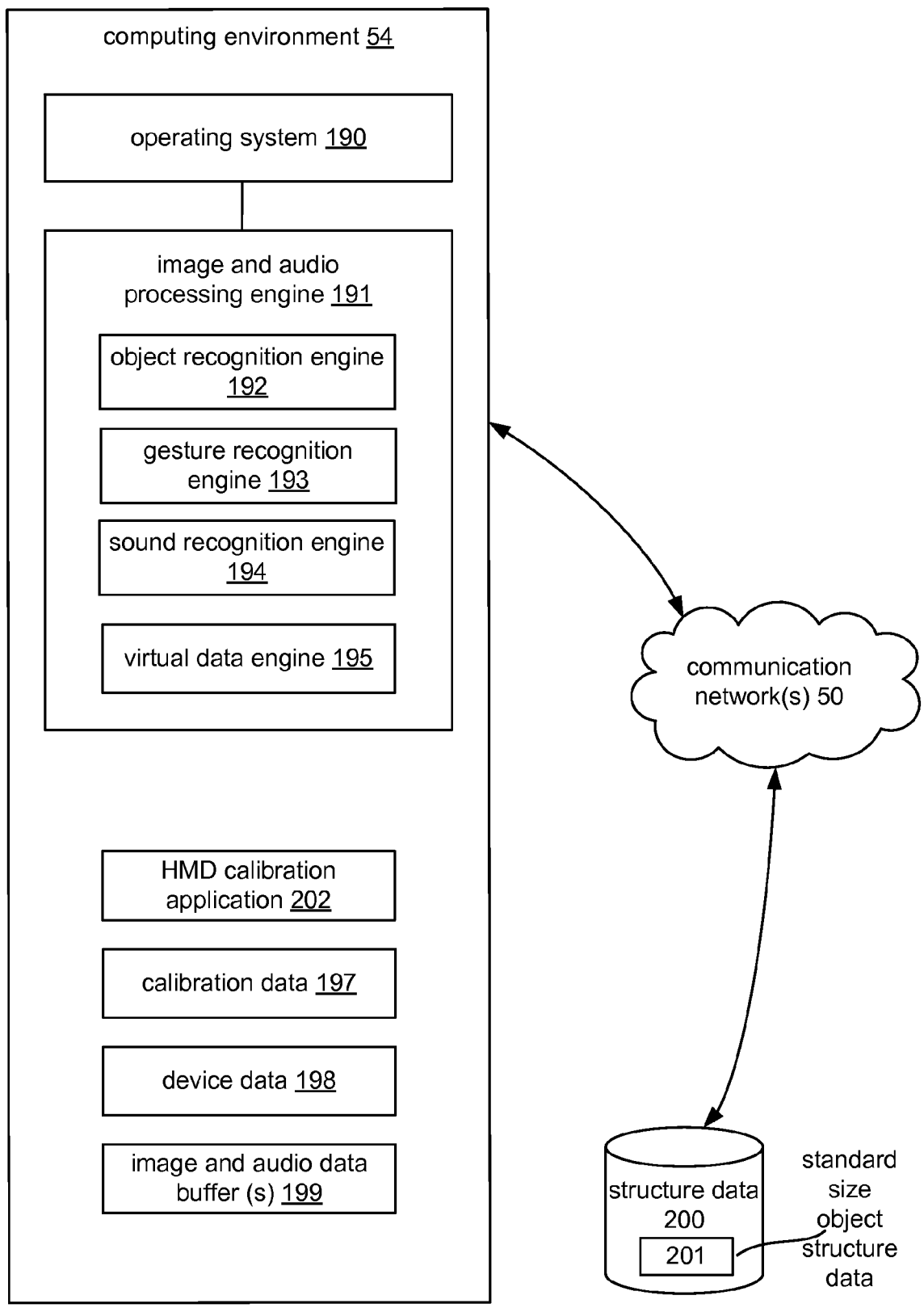
FIG. 3 illustrates a computing environment embodiment from a software perspective which may be implemented by the display device system or a remote computing system in communication with the display device system.

FIG. 3 illustrates a computing environment embodiment from a software perspective which may be implemented by the display device system 8 or a remote computing system 12 in communication with the display device system. Similar applications may exist in both systems 8, 12 for leveraging available computing resources provided by network connectivity. As shown in the embodiment of FIG. 3, the software components of a computing environment 54 include an image and audio processing engine 191 in communication with an operating system 190. Image and audio processing engine 191 includes object recognition engine 192, gesture recognition engine 193, sound recognition engine 194, virtual data engine 195, all in communication with each other. Image and audio processing engine 191 processes video, image, and audio data received from a capture device such as the outward facing cameras 113 or the depth camera 163. To assist in the detection and/or tracking of objects, an object recognition engine 192 of the image and audio processing engine 191 may access one or more databases 200 of structure data 200 over a communication network 50.

Virtual data engine 195 processes virtual objects and registers the position and orientation of virtual objects in relation to one or more coordinate systems. A virtual object position may be registered or dependent on a position of a corresponding real object. The virtual data engine 195 determines the position of image data of a virtual object in display coordinates for each display optical system 14 based on the fixed relationship between camera coordinates and display coordinates and the current calibration position of the outward facing cameras 113. The virtual data engine 195 may also determine the position of virtual objects in various maps of a real-world environment stored in a memory unit of the display device system 8 or of the computing system 12. One map may be the field of view of the display device with respect to one or more reference points on the display device system 8. In other examples, the real-world environment map may be independent of the display device, e.g. a 3D map or model of a store.

One or more processors of the computing system 12, or the display device system 8 or both also execute the object recognition engine 192 to identify real objects in image data captured by the environment facing cameras 113. As in other image processing applications, a person can be a type of object. For example, the object recognition engine 192 may implement pattern recognition based on structure data 200 to detect particular objects (e.g., soccer balls, cars, or landmarks) as well as a skeleton indicating a human. The object recognition engine 192 may also include facial recognition software which is used to detect the face of a particular person.

The gesture recognition engine 193 can identify actions indicating a control or command to an executing application, for example a recalibration request to the HMD calibration application 202. In one embodiment, the gesture recognition engine 193 includes a collection of gesture filters, each comprising information concerning a gesture that may be performed by at least a part of a skeletal model. The gesture recognition engine 193 compares the captured image data in the form of the skeletal model and movements associated with it to the gesture filters in a gesture library to identify when a user (as represented by the skeletal model) has performed one or more gestures. In some examples, a camera, in particular a depth camera in the real environment separate from the display device 2 in communication with the display device system 8 or a computing system 12 may detect the gesture and forward a notification to the system 8, 12. In other examples, the gesture may be performed in view of the cameras 113 by a body part such as the user's hand or one or more fingers.

The sound recognition engine 194 processes audio received via microphone 110. Data of faces, voices, sounds, and objects to be detected may be stored in a network accessible structure data 200, in a local datastore 244, or a combination of remote and local storage. Upon detection of one or more objects, image and audio processing engine 191 may report to operating system 190 an identification of each object detected and a corresponding position and/or orientation which the operating system 190 passes along to an application like HMD calibration application 202.

In some embodiments, one or more objects being tracked for calibration such as a predetermined pattern may be augmented with one or more markers to improve object detection and predetermined geometric properties. For example, IR retroreflective markers, on the vertices or corners of the squares in the checkerboard pattern 5 assist the object recognition software identify the vertices more easily resulting in the HMD calibration software 202 having more accurate data from which to identify a predetermined length.

The image and audio processing engine 191 may utilize structural data 200 while performing object recognition. Structure data 200 may include structural information about targets and/or objects to be tracked. For example, a skeletal model of a human may be stored to help recognize body parts. In another example, structure data 200 may include structural information regarding one or more inanimate objects in order to help recognize the one or more inanimate objects. In this example, one or more databases of structure data 200 include a subset of standard size object structure data 201. As per the embodiment of FIG. 2B, HMD calibration software 202 may request a notification from the object recognition engine 192 of an identification of a standard sized real object detected in the real environment model.

More information about the detection and tracking of objects can be found in U.S. patent application Ser. No. 12/641,788, "Motion Detection Using Depth Images," filed on Dec. 18, 2009; and U.S. patent application Ser. No. 12/475,308, "Device for Identifying and Tracking Multiple Humans over Time," both of which are incorporated herein by reference in their entirety. More information about the gesture recognition engine 193 can be found in U.S. patent application Ser. No. 12/422,661, "Gesture Recognizer System Architecture," filed on Apr. 13, 2009, incorporated herein by reference in its entirety. More information about recognizing gestures can be found in U.S. patent application Ser. No. 12/391,150, "Standard Gestures," filed on Feb. 23, 2009; and U.S. patent application Ser. No. 12/474,655, "Gesture Tool," filed on May 29, 2009, both of which are incorporated by reference herein in their entirety.

The computing environment 54 also stores data such as in image and audio data buffer(s) 199. The buffers provide memory for receiving image data captured from the outward facing cameras 113, buffers for holding image data of virtual objects to be displayed by the image generation units 125, and buffers for audio data such as voice commands from the user via microphone 110 and instructions to be sent to the user via earphones 130. Device data 198 includes data about the device such as its serial number and any network address, e.g. IP address. Additionally, the device data 198 receives data from the various sensors on the display device 2 for monitoring the health of the operational state of the display device. For example, position and orientation data from the one or more motion and orientation sensing unit 132 of the cameras 113 can identify that the spatial relationship between the cameras 113 has changed.

Calibration data 197 includes a fixed mapping from camera coordinates for the image sensors of front facing cameras to display coordinates allowed by the fixed spatial relationship between each camera, e.g. 113r and a corresponding see-through display, e.g. 14r. As an illustrative example, the image sensor of the camera may be made up of sensing elements, and the image data from a particular sensing element at a particular location is mapped to a position on the display. Additionally, the calibration data 197 stores the initial calibration spatial relationship between the cameras 113. Additionally, the calibration data 197 may store the calibration of the current spatial relationship. As a user adjusts his or her HMD for the fit comfortable for him or her, the HMD calibration software can also automatically detect a change in the spatial relationship between the cameras. The spatial relationship may change in any of six degrees of freedom, for example along any of three translation axes and for rotations around any of the three translation axes.

Although a display may move, and a front facing camera may have a different position for a real object in its field of view, the user looking through the display still sees the real object in an unchanged perspective because the user's eye in his or her skull did not move. The position of a virtual object on the display which is registered to a real object is updated to register with the real object as it is determined the user sees it through the display.

The HMD calibration software 202 monitors the spatial relationship between the outward facing cameras 113. The HMD calibration software 202 communicates with the object recognition engine 192 (e.g. via the operating system 190) for identifying and accessing image data for one or more real objects which may be used for calibration. As discussed above, examples of a real object which may be used for calibration include a real object with a predetermined pattern for calibration, a standard size object detected in a user's environment, or an object for which a geometric measurement is obtained using depth data.

FIGS. 4A through 9 present embodiments of methods for the technology and example implementation processes for some of the steps of the methods. For illustrative purposes, the method embodiments below are described in the context of the system embodiments described above. However, the method embodiments are not limited to operating in the system embodiments described above and may be implemented in other system embodiments.

Figure 4A:
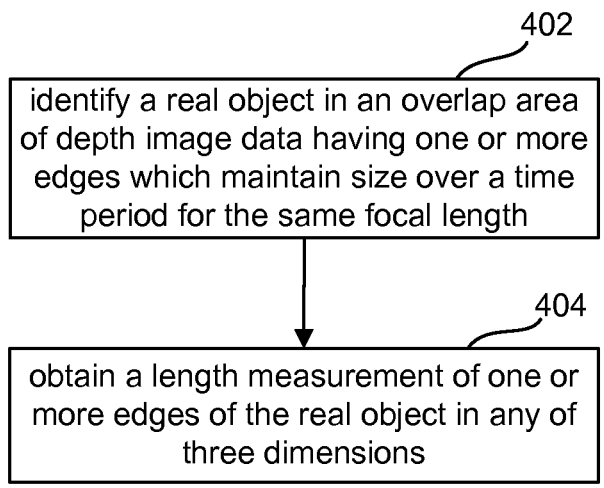
FIG. 4A illustrates an embodiment of a process for selecting a real object as a calibration object based on depth image data.
Figure 4B:
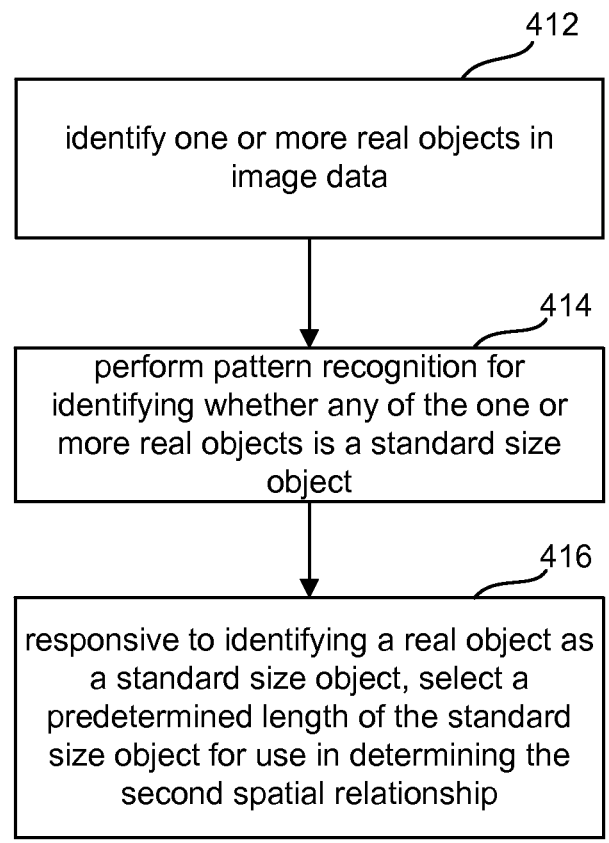
FIG. 4B illustrates an embodiment of a process for identifying whether any standard size object has been detected which may be used as a calibration object.

As noted in the embodiments of FIGS. 2B and 2C, a real object for calibration may be identified from real objects in a user field of view or environment of the user. FIGS. 4A and 4B describe processes for selecting a real object for calibration.

FIG. 4A illustrates an embodiment of a process for selecting a real object as a calibration object based on depth image data. In step 402, the object recognition engine 192 identifies a real object in an overlap area of depth image data having one or more edges which maintain size over a time period for the same focal length. A notification may be sent to the HMD calibration software 202, particularly if the HMD calibration software 202 has sent a message indicating the system is to be recalibrated. The HMD calibration software 202 obtains a length measurement of one or more edges of the real object in any of three dimensions in step 404 and uses the object for recalibration.

FIG. 4B illustrates an embodiment of a process for identifying whether any standard size object has been detected which may be used as a calibration object. In step 412, the object recognition engine 192 identifies one or more real objects in image data, and performs pattern recognition in step 414 for identifying whether any of the one or more real objects is a standard size object. Responsive to identifying a real object as a standard size object, the HMD calibration software 202 is notified and selects a predetermined length of the standard size object for use in determining the second spatial relationship in step 416.

Figure 5A:
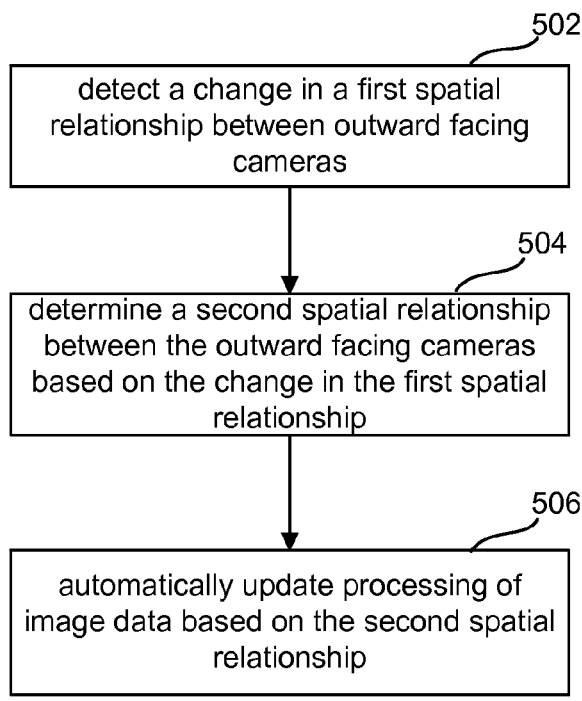
FIG. 5A illustrates an embodiment of a method for recalibrating a see-through, head mounted, mixed reality display system.

FIG. 5A illustrates an embodiment of a method for recalibrating a see-through, head mounted, mixed reality display system.

Figure 5B:
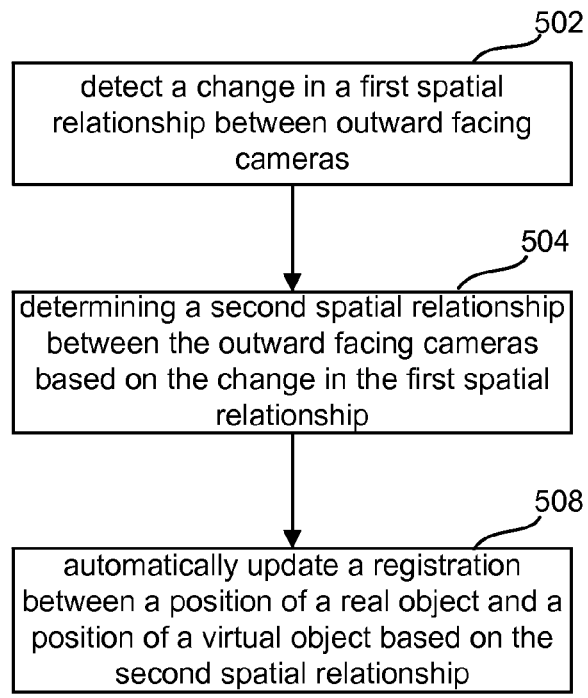
FIG. 5B illustrates another embodiment of a method for recalibrating a see-through, head mounted, mixed reality display system.

FIG. 5B illustrates another embodiment of a method for recalibrating a see-through, head mounted, mixed reality display system. In step 502, the HMD calibration software 202 automatically detects a change in a first spatial relationship between outward facing cameras. The HMD calibration software in step 504 determines a second spatial relationship between the outward facing cameras based on the change and the first spatial relationship, and automatically updates, in step 506, the registration between the position of the real object and the position of the virtual object based on the second spatial relationship FIG. 6A illustrates an embodiment of a process for automatically detecting a change in a first spatial relationship between real environment facing or outward facing cameras of the display device based on image data. The process may be used to implement step 502 in FIGS. 5A and 5B. In step 512, the HMD calibration software 202 receives a notification indicating to check an area of stereo overlap in shared field of view of outward facing cameras. For example, there may be a scheduled periodic check of the image data, or the area size is checked for each set of data (e.g. a frame) as it is processed for object identification. In step 514, the HMD calibration software 202 determines whether the area size of overlapping image data from the outward facing cameras changed from a stored area size from a previous calibration. For calibration, determining a change in calibration may be with respect to an initial calibration (e.g. determined at the manufacturer) or with respect to a previous calibration. If there has been an area size change in the overlapping image data, then the HMD calibration software 202 performs step 504. Otherwise if no change, processing returns in step 516 to other tasks until a next scheduled check or the next set of data is processed.

FIG. 6B illustrates another embodiment of a process, which may be used for implementing step 502, for automatically detecting a change in a first spatial relationship between real environment facing or outward facing cameras of the display device based on motion sensor data. As in the examples of FIGS. 2A through 2C, the motion sensors 132 can provide position and orientation data for each camera. In step 522, the HMD calibration software 202 receives motion sensor data for each outward facing camera and determines, in step 524, whether the motion sensor data indicates a different change in position from that of another camera beyond a threshold. Position change may include orientation as well as translation change. As the user's head moves, the position and orientation of each camera changes, but when calibrated, the relative position and orientation between the cameras remains the same, at least within a threshold. If there has been change in relative position and orientation of the cameras, then the HMD calibration software 202 performs step 504. Otherwise if no change, processing returns in step 526 to other tasks until a next scheduled check or the next set of data is processed.

FIG. 6C illustrates yet another embodiment of a process, which may be used for implementing step 502, for automatically detecting a change in a first spatial relationship between real environment facing or outward facing cameras of the display device based on photogrammetry with respect to overlapping image data captured by the outward facing cameras. In step 532, the HMD calibration software 202 performs a calibration check based on photogrammetry, for example using triangulation, with respect to overlapping image data captured by the outward facing cameras. In step 534, the HMD calibration software 202 determines whether the photogrammetry calibration check indicates a change in the first spatial relationship between the outward facing cameras. If the calibration check indicates there has been a change in the spatial relationship, for example beyond a threshold, between the cameras, then the HMD calibration software 202 performs step 504. Otherwise if no change, processing returns in step 536 to other tasks until a next scheduled check or the next set of data is processed.

Figure 7A:
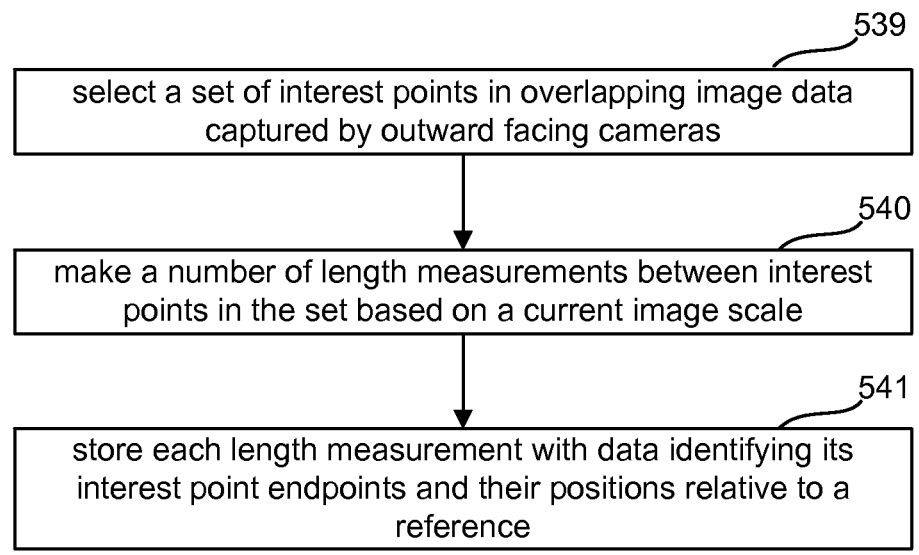
FIG. 7A is an embodiment of a process for generating measurements between image points for use in a triangulation method.
Figure 7B:
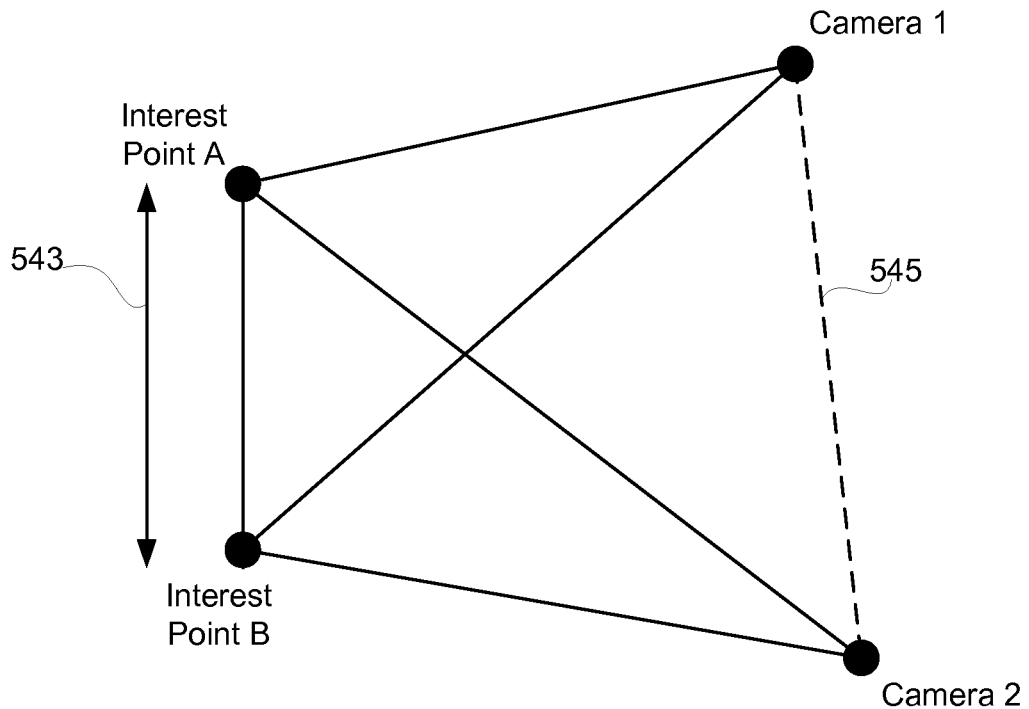
FIG. 7B illustrates an example overview of geometric relationships between a measurement with image points as endpoints and camera positions, which relationships may be used to determine a spatial relationship between the cameras.
Figure 7C:
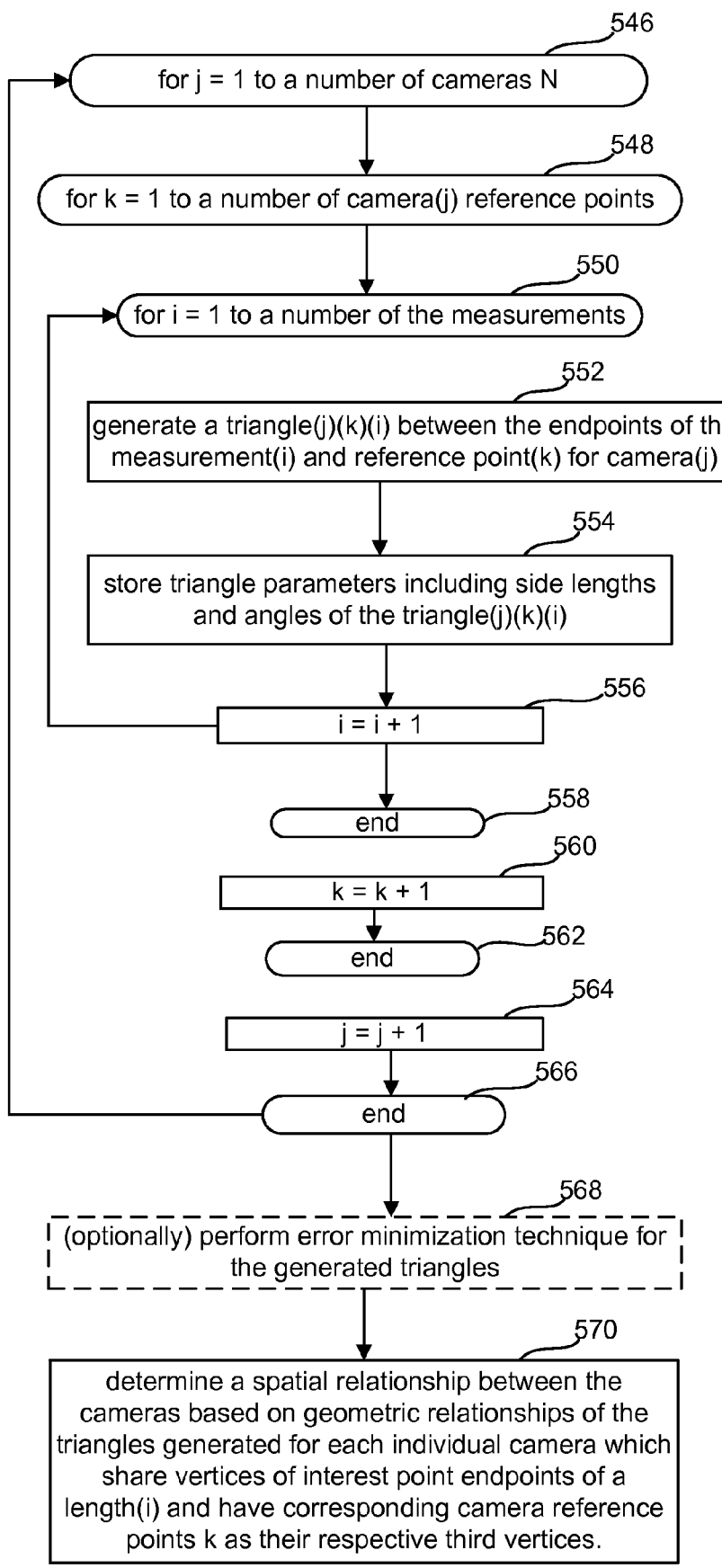
FIG. 7C illustrates an embodiment of a process for performing photogrammetry based on triangulation with respect to overlapping image data captured by the outward facing cameras.

FIGS. 7A, 7B and 7C describe a triangulation approach which may be used for two dimensional processing and can be extended to three dimensional processing as known to those of ordinary skill in the art.

FIG. 7A is an embodiment of a process for generating measurements between image points for use in a triangulation method. The process of FIG. 7A may be omitted when using a predetermined pattern like pattern 5 in FIG. 2A where the interest points, e.g. vertices of the squares, have been pre-identified and the measurements already done and stored offline. The cameras still identify the vertices and squares in the image data and their relative positions, e.g. uppermost left corner square. Pattern matching and the markers may be used as discussed above for the identification. For a standard size object like stop sign 180, the interest points may be pre-selected but are identified after pattern matching and the measurement lengths in between the identified interest points are downloaded from a datastore 201. For an object like object 182 which is identified in image data and depth data as in FIG. 2C, image processing techniques like edge detection for feature detection are applied to select interest points and length measurements are made. Features like corners and sharp edges are examples of often selected as interest points due to their clear demarcation from other elements of the image. Additionally, during normal operation checks where an object with predetermined measurements may not be in the scene, measurements are made based on a current scale and are used to check the current spatial relationship.

In step 539, the HMD calibration software 539 selects a set of interest points in overlapping image data captured by outward facing cameras using known imaging techniques. In step 540, the HMD calibration software makes a number of length measurements between interest points in the set based on a current image scale, and in step 541, stores each length measurement with data identifying its interest point endpoints and their positions relative to a reference. For example, the reference may be a center of an object in the image data. The number of interest points beyond two and the number of measurements beyond one is a matter of design choice for a particular triangulation algorithm, and accuracy desired.

FIG. 7B illustrates an example overview of geometric relationships between a measurement with image points as endpoints and camera positions, which relationships may be used to determine a spatial relationship between the cameras. Often in descriptions of triangulation examples, the camera positions with respect to each other are predetermined, and it is the position of the object relative to the known camera positions which is determined. In FIG. 7C, a length measurement 543 between two interest points is the predetermined or known length, and the spatial relationship 545 between the cameras is the unknown. A first triangle is formed between interest points A and B and Camera 1 which includes side 543. A second triangle is formed between points A and B and Camera 2 which also includes length measurement 543 as a side. Based on the geometric properties and relationships, present in or which may be derived from, these two triangles in this example, vector 545 representing a spatial relationship can be determined between the Cameras 1 and 2.

FIG. 7C illustrates an embodiment of a process for performing photogrammetry based on triangulation with respect to overlapping image data captured by the outward facing cameras. This embodiment is a reusable method which may implement step 532 for performing a calibration check based on triangulation and may also be used to implement step 556 of FIG. 8 for determining a second spatial relationship between the outward facing cameras based on the change in the first spatial relationship. A current image scale may be a scale determined for the initial calibration at the factory or determined in a previous recalibration. This example is performed for cameras with overlapping fields of view. For loops are shown simply as illustrative logical structures, and are not meant to be limiting of implementations of the technology. In step 546, a camera counter j is initialized, as is a camera reference point counter k in step 548 and a measurements counter i in step 500. A camera reference point may be an element on the image sensor of a camera or a point in the image plane of the camera corresponding to a sensor element. Besides translation of the cameras, rotation of the cameras is also being determined. By forming triangles with respect to multiple reference points of a camera image sensor or image plane, rotation can be determined as well. The camera reference points may be selected for corresponding sensing elements of image sensors for the cameras which are expected to capture overlapping image data based on a previous calibration.

For an embodiment with a depth camera, two-dimensional triangulation can be performed, and depth data may provide the third dimension. In step 554, the HMD calibration software 202 generates a triange(j)(k)(i) between the endpoints of the measurement(i) and the reference point(k) for camera(j), and in step 554 stores triangle parameters including side lengths and angles of the triangle(j)(k)(i). The measurement index i is incremented in step 556, and steps 552, 554 and 556 are repeated to generate and store triangles between the interest point endpoints of each measurement length(i) and the current reference point k of the camera j being currently processed. At the end 558 of the processing of lengths for reference point k, the camera reference point counter k is incremented in step 560, and steps 550 through 560 repeated. After the end 562 of processing for the number of reference points k for camera j, the process repeats for another camera. The camera index j is incremented in step 564, and the processing of steps 548 through 564 continues for the remaining cameras.

At the end 566 of processing for the number of cameras, the HMD calibration software 202 optionally, but typically, performs an error minimization technique for the generated triangles. The length measurements determined based on a scale are approximations. The intersection of sides of the triangles from the endpoints to the camera reference point k may be approximated in some instances.

Figure 8:
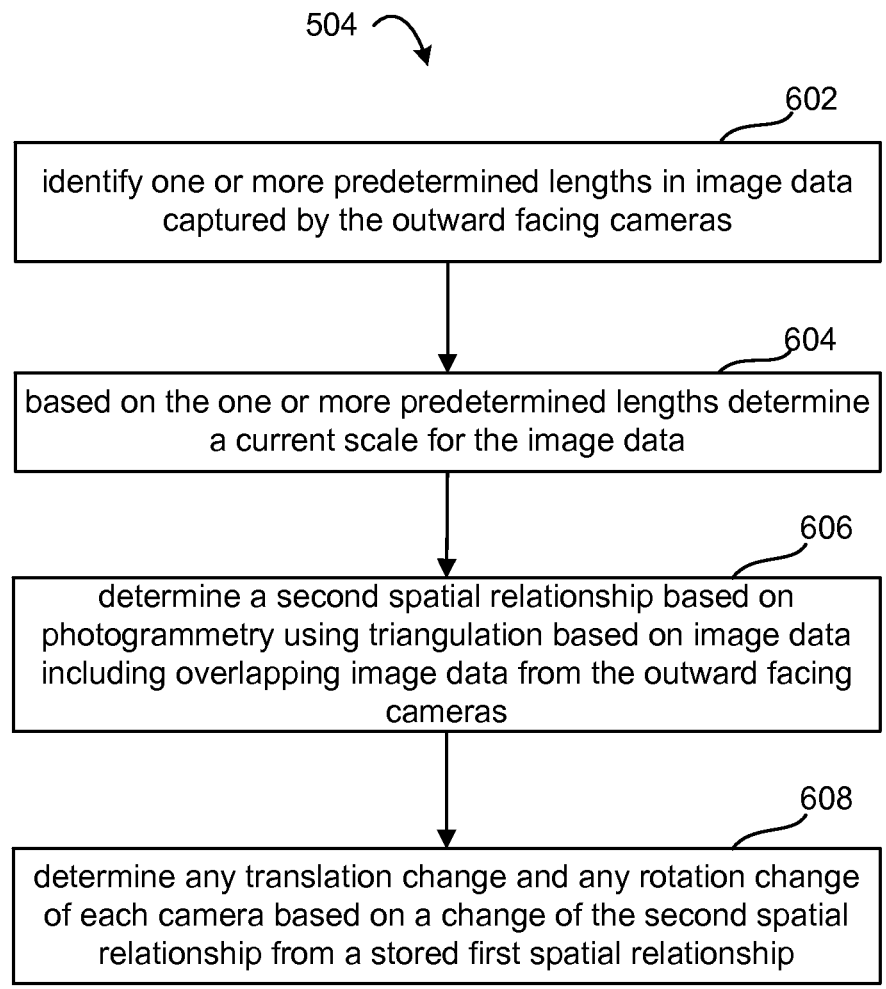
FIG. 8 illustrates an embodiment of a method for determining a second spatial relationship between the outward facing cameras based on the change in the first spatial relationship.

In step 570, the HMD calibration software 202 determines a spatial relationship between the cameras based on geometric relationships of the triangles generated for each individual camera which share vertices of interest point endpoints of a length(i) and have corresponding camera reference points k as their respective third vertices. FIG. 8 illustrates an embodiment of a method for determining a second spatial relationship between the outward facing cameras based on the change in the first spatial relationship. In step 602, the HMD calibration software 202 identifies one or more predetermined lengths in image data captured by the outward facing cameras. In step 604, based on the one or more predetermined lengths, a current scale for the image data is determined. In step 606, a second spatial relationship is determined based on photogrammetry using triangulation based on image data including overlapping image data from the outward facing cameras. This step may be implemented by the method embodiment of FIG. 7.

In step 608, the HMD calibration software 202 determines any translation change and any rotation change of each camera based on a change of the second spatial relationship from a stored first spatial relationship. Processing of the image data, such as virtual to real object registration, or mapping of the user's real environment can then be performed based on the determined second spatial relationship between the cameras.

Figure 9:
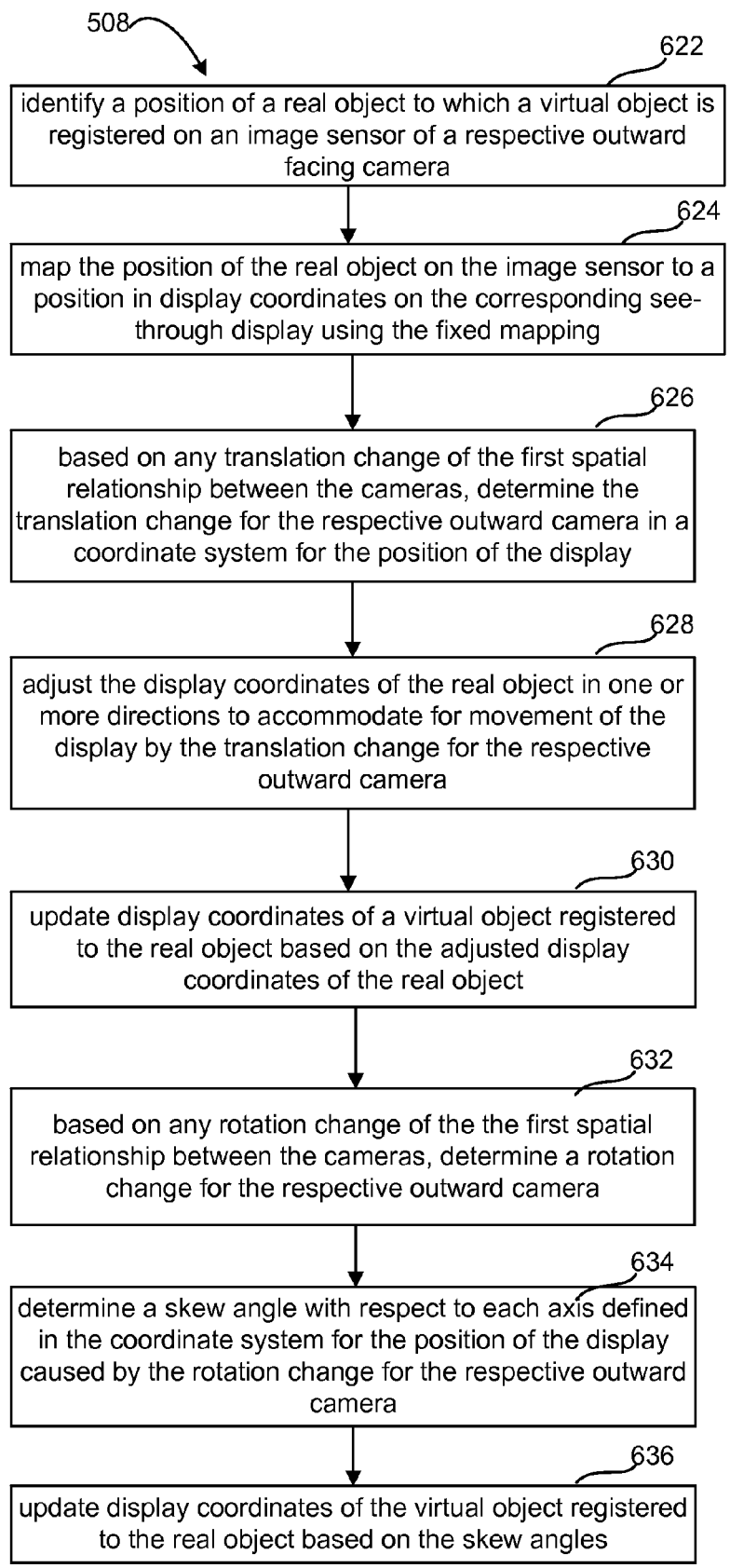
FIG. 9 illustrates an embodiment of a process for updating a registration between a position of a real object and a position of a virtual object based on the second spatial relationship.

FIG. 9 illustrates an embodiment of a process for updating a registration between a position of a real object and a position of a virtual object based on the second spatial relationship. The fixed spatial relationship between each camera 113 and a display 14 attached to the same rigid frame portion 119 allows a mapping between each image sensing element to a location on the display in display coordinates. The effects of rotation and translation of the display are also accounted for in determining real object positions and hence, virtual object positions, as the user's eye does not translate and rotate with the display, but still looks through the display at the real object.

In step 622, the HMD calibration software 202 identifies a position of a real object to which a virtual object is registered on an image sensor of a respective outward facing camera, and in step 624, maps the position of the real object on the image sensor to a position in display coordinates on the corresponding see-through display based on the fixed mapping between image sensor position coordinates and display coordinates allowed by the fixed spatial relationship between the camera and its corresponding display.

In step 626, based on any translation change of the spatial relationship between the cameras, the HMD calibration software 202 determines the translation change for the respective outward camera in a coordinate system for the position of the display itself. An example of such a coordinate system uses an intersection point of the optical axis 142 of a display optical system 14r with a point of the display, e.g. center of the display, as an X, Y, Z origin with the optical axis 142 representing the Z depth axis. The X axis is for tracking left-right movement, and the Y axis tracks up-down movement. Rotation may be defined with respect to rotation around any of the translation axes X, Y, Z. Besides rotation change determined from photogrammetry such as triangulation as in FIG. 7C, and motion sensor data for the respective outward facing camera can also provide rotation change data.

In step 628, the HMD calibration software 202 adjusts the display coordinates of the real object in one or more directions to accommodate for movement of the display as indicated by the translation change for the respective outward camera. The see-through display cannot move the real object, but by adjusting the display coordinates associated with the real object to where the user is looking through the display at the real object, the virtual object display coordinates can be updated.

For example, if the camera 113r and display 14r moved straight up, the user's eye did not move straight up. The user is looking at the real object now in a lower portion of the display optical system 14r. The mapping from image sensor to display coordinates for the real object before recalibration would be to an upper portion of the display, and any virtual object would appear with respect to that upper portion. In this example, the display coordinates for the real object are adjusted to be lower on the display in proportion to the upperward movement of the camera and display. Similarly, a translation along the X axis for left or right movement results in a translation of the real object display coordinates in the opposite direction along the X axis. For the Z axis, if the camera 113 moves closer to the real object and farther from the user eye 140, the real object appears bigger on the image sensor then on the user's retina which did not change position. The display coordinates for the real object can be scaled down in proportion to the Z direction change. In step 630, the display coordinates of a virtual object registered to the real object based on the adjusted display coordinates of the real object is updated.

With a rotated display, the user sees the real object straight onward, but the virtual object appears at an angle or skewed because it is being displayed on the rotated display. In step 632, based on any rotation change of the spatial relationship between the cameras, the HMD calibration software 202 determines the rotation change for the respective outward camera, and in step 634, determines a skew angle with respect to each axis defined in the coordinate system for the display caused by the rotation change for the respective outward camera. Again, motion sensor data for the respective outward facing camera may also provide rotation change data. The HMD calibration software 202 updates the display coordinates for the virtual object registered to the real object based on the skew angles in step 636. The updating is to counter the skew. In other words, the negative of the skew angles are applied to the virtual object display coordinates so the virtual object does not appear skewed.

Figure 10:
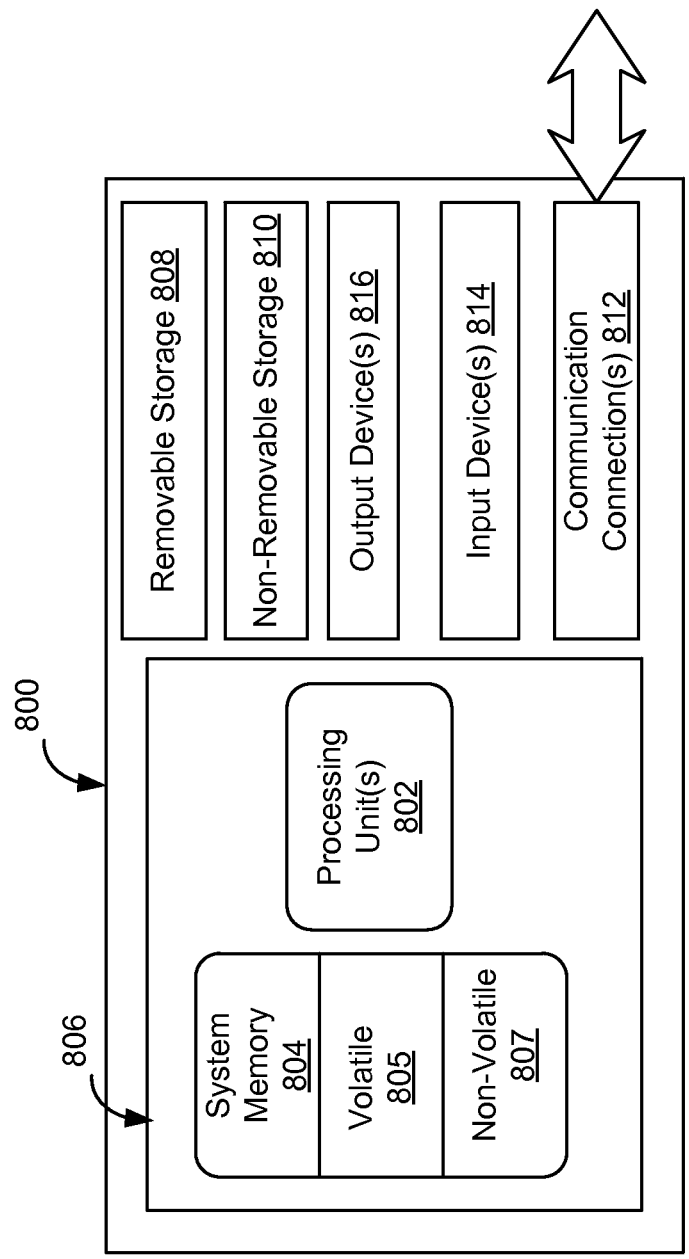
FIG. 10 is a block diagram of one embodiment of a computing system that can be used to implement a network accessible computing system.

FIG. 10 is a block diagram of one embodiment of a computing system that can be used to implement a network accessible computing system like computing system 12. With reference to FIG. 10, an exemplary system for implementing the invention includes a computing device, such as computing device 800. In its most basic configuration, computing device 800 typically includes one or more processing units 802 and may include different types of processors as well such as central processing units (CPU) and graphics processing units (GPU). Computing device 800 also includes memory 804. Depending on the exact configuration and type of computing device, memory 804 may include volatile memory 805 (such as RAM), non-volatile memory 807 (such as ROM, flash memory, etc.) or some combination of the two. This most basic configuration is illustrated in FIG. 10 by dashed line 806. Additionally, device 800 may also have additional features/functionality. For example, device 800 may also include additional storage (removable and/or non-removable) including, but not limited to, magnetic or optical disks or tape. Such additional storage is illustrated in FIG. 10 by removable storage 808 and non-removable storage 810.

Device 800 may also contain communications connection(s) 812 such as one or more network interfaces and transceivers that allow the device to communicate with other devices. Device 800 may also have input device(s) 814 such as keyboard, mouse, pen, voice input device, touch input device, etc. Output device(s) 816 such as a display, speakers, printer, etc. may also be included. All these devices are well known in the art and need not be discussed at length here.

Figure 11:
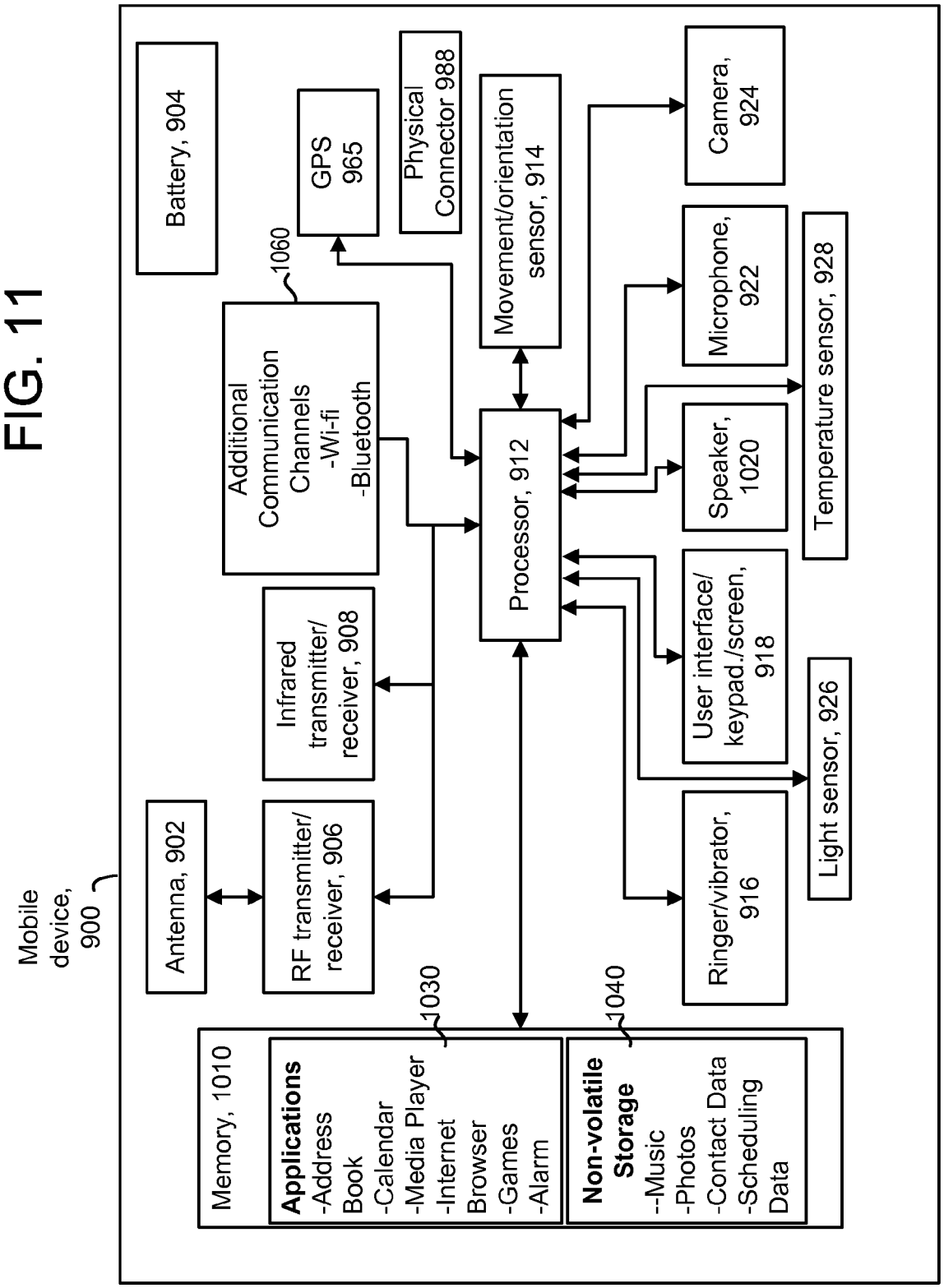
FIG. 11 is a block diagram of an exemplary mobile device which may operate in embodiments of the technology.

As discussed above, the processing unit 4 may be embodied in a mobile device 5. FIG. 11 is a block diagram of an exemplary mobile device 900 which may operate in embodiments of the technology. Exemplary electronic circuitry of a typical mobile phone is depicted. The phone 900 includes one or more microprocessors 912, and memory 910 (e.g., non-volatile memory such as ROM and volatile memory such as RAM) which stores processor-readable code which is executed by one or more processors of the control processor 912 to implement the functionality described herein.

Mobile device 900 may include, for example, processors 912, memory 1010 including applications and non-volatile storage. The processor 912 can implement communications, as well as any number of applications, including the interaction applications discussed herein. Memory 1010 can be any variety of memory storage devices types, including non-volatile and volatile memory. A device operating system handles the different operations of the mobile device 900 and may contain user interfaces for operations, such as placing and receiving phone calls, text messaging, checking voicemail, and the like. The applications 930 can be any assortment of programs, such as a camera application for photos and/or videos, an address book, a calendar application, a media player, an internet browser, games, other multimedia applications, an alarm application, other third party applications like applications for performing processing for the display device 2 discussed herein, and the like. The non-volatile storage component 940 in memory 910 contains data such as web caches, music, photos, contact data, scheduling data, and other files.

The processor 912 also communicates with RF transmit/receive circuitry 906 which in turn is coupled to an antenna 902, with an infrared transmitted/receiver 908, with any additional communication channels 960 like Wi-Fi, WUSB, RFID, infrared or Bluetooth, and with a movement/orientation sensor 914 such as an accelerometer. Accelerometers have been incorporated into mobile devices to enable such applications as intelligent user interfaces that let users input commands through gestures, indoor GPS functionality which calculates the movement and direction of the device after contact is broken with a GPS satellite, and to detect the orientation of the device and automatically change the display from portrait to landscape when the phone is rotated. An accelerometer can be provided, e.g., by a micro-electromechanical system (MEMS) which is a tiny mechanical device (of micrometer dimensions) built onto a semiconductor chip. Acceleration direction, as well as orientation, vibration and shock can be sensed. The processor 912 further communicates with a ringer/vibrator 916, a user interface keypad/screen, biometric sensor system 918, a speaker 920, a microphone 922, a camera 924, a light sensor 921 and a temperature sensor 927.

The processor 912 controls transmission and reception of wireless signals. During a transmission mode, the processor 912 provides a voice signal from microphone 922, or other data signal, to the RF transmit/receive circuitry 906. The transmit/receive circuitry 906 transmits the signal to a remote station (e.g., a fixed station, operator, other cellular phones, etc.) for communication through the antenna 902. The ringer/vibrator 916 is used to signal an incoming call, text message, calendar reminder, alarm clock reminder, or other notification to the user. During a receiving mode, the transmit/receive circuitry 906 receives a voice or other data signal from a remote station through the antenna 902. A received voice signal is provided to the speaker 920 while other received data signals are also processed appropriately.

Additionally, a physical connector 988 can be used to connect the mobile device 900 to an external power source, such as an AC adapter or powered docking station. The physical connector 988 can also be used as a data connection to a computing device. The data connection allows for operations such as synchronizing mobile device data with the computing data on another device.

A GPS receiver 965 utilizing satellite-based radio navigation to relay the position of the user applications is enabled for such service.

The example computer systems illustrated in the figures include examples of computer readable storage devices. Computer readable storage devices are also processor readable storage devices. Such devices may include volatile and nonvolatile, removable and non-removable storage devices implemented in any method or technology for storage of information such as computer readable instructions, data structures, program modules or other data. Some examples of computer storage devices are RAM, ROM, EEPROM, cache, flash memory or other memory technology, CD-ROM, digital versatile disks (DVD) or other optical disk storage, memory sticks or cards, magnetic cassettes, magnetic tape, a media drive, a hard disk, magnetic disk storage or other magnetic storage devices, or any other device which can be used to store the desired information and which can be accessed by a computer.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of recalibrating a head mounted, mixed reality display system having a frame including a flexible frame portion disposed between displays such that a spatial relationship between the displays changes when the flexible frame portion flexes, the displays respectively including respective see-through displays, the method comprising:

detecting a change in a first spatial relationship between outward facing and digital image data capturing cameras supported by the frame of the head mounted, mixed reality display system, the frame positioning the see-through displays for respective positioning before respective ones of user eyes, each outward facing camera having a fixed spatial relationship with respect to its respective see-through display, the flexible frame portion being positioned in-between the outward facing cameras and in-between the see-through displays so that flexing of the flexible frame portion changes at least one spatial relationship between the cameras as well as changing a corresponding at least one spatial relationship between the see-through displays due to the corresponding fixed spatial relationship between each camera and its respective see-through display;

determining a second spatial relationship between the outward facing cameras based on the detected change in the first spatial relationship between the outward facing cameras; and automatically updating processing of image data based on the second spatial relationship and the fixed spatial relationship of each outward facing camera with respect to its respective see-through display.

2. The method of claim 1 wherein detecting a change in the first spatial relationship between the outward facing cameras of the head mounted mixed reality display system is based on performing photogrammetry on overlapping image data from the outward facing cameras.

3. The method of claim 1 wherein detecting a change in the first spatial relationship between the outward facing cameras of the head mounted, mixed reality display system is based on motion sensor data indicating different changes in position of one camera from that of another beyond a threshold.

4. The method of claim 1 wherein determining the second spatial relationship between the outward facing cameras based on the change in the first spatial relationship further comprises determining a scale for image data based on a predetermined geometrical measurement of an object in a field of view of the head mounted, mixed reality display system.

5. The method of claim 1 wherein determining the second spatial relationship between the outward facing cameras based on the change in the first spatial relationship further comprises determining a geometrical measurement of a real object in a field of view of the head mounted, mixed reality display system based on depth data.

6. The method of claim 1 wherein the change in the first spatial relationship between the outward facing cameras includes a rotational change.

7. The method of claim 1 wherein the change in the first spatial relationship between the outward facing cameras includes a translational change.

8. A head mounted, mixed reality display system comprising:

a frame including a flexible frame portion positioned in between see-through displays positioned by the frame and positioned in between outward facing, digital image data capturing cameras supported by the frame such that a first spatial relationship between the displays changes when the flexible frame portion flexes and such that a second spatial relationship between the cameras correspondingly changes when the flexible frame portion flexes;

each display being positioned by the frame to be seen by a respective eye;

each outward facing camera being configured for capturing image data of a real object in a field of view of a respective one of the see-through displays and having a fixed spatial relationship with respect to its respective see-through display thus providing for a fixed mapping from position coordinates on an image sensor of the outward facing camera to positions coordinates on the respective see-through display;

a memory operatively coupled to the cameras for storing corresponding image data respectively captured by the cameras of a common real object in the respective fields of views of the cameras, the memory being further operatively coupled to store data representing the second spatial relationship and to store data representing the respective fixed spatial relationship for each outward facing camera and its respective display; and one or more processors having access to the memory and being communicatively coupled to the cameras and displays, the one or more processors being configured to automatically detect a change in the second spatial relationship of the outward facing cameras relative to each other based on respective image data provided by the outward facing cameras and to automatically update a registration between a position of the common real object and a position of a virtual object responsive to the determined change in the second spatial relationship between the outward facing cameras.

9. The head mounted, mixed reality display system of claim 8 wherein the flexible frame portion is a flexible nose bridge section capable of rotating and translating.

10. The head mounted, mixed reality display system of claim 8 further comprising:

one or more motion sensing units communicatively coupled to the one or more processors for sending data to the one or more processors as bases for automatically detecting a change in the second spatial relationship between the outward facing cameras of the head mounted, mixed reality display.

11. The head mounted mixed reality display system of claim 8 further comprising:

the one or more processors automatically detecting a change in the second spatial relationship between the outward facing cameras based on detecting an area size change in overlapping image data from each of the outward facing cameras.

12. The head mounted, mixed reality display of claim 11 further comprising:

a depth camera for providing depth data of a real object wherein the one or more processors determine a fixed geometrical measurement with respect to the real object for defining a scale for image data; and the one or more processors perform photogrammetry based on the scale determined using the fixed geometrical measurement.

13. The head mounted, mixed reality display system of claim 8 further comprising:

a network interface communicatively coupled to the one or more processors for accessing a computer system with access to one or more databases of images of objects of standard size over a network;

the one or more processors sending image data from the outward facing cameras to the computer system and requesting an identification of any real object in the image data which matches an object of standard size; and responsive to receiving an identification of a standard size real object in the image data, the one or more processors perform photogrammetry using a predetermined fixed geometrical measurement of the standard size real object.

14. One or more processor readable storage devices having instructions encoded thereon which when executed cause one or more processors to perform a method of recalibrating a head mounted, mixed reality display system having a flexible frame portion disposed between displays such that a first spatial relationship between the displays changes when the flexible frame portion flexes, the displays respectively including respective see-through displays, the method comprising:

automatically detecting a change in a second spatial relationship between outward facing and digital image data capturing cameras supported by the frame of the head mounted, mixed reality display system, the frame positioning the see-through displays to be seen through by user eyes, each outward facing camera having a fixed spatial relationship with respect to a corresponding one of the see-through displays thus providing for a fixed mapping from position coordinates on an image sensor of the outward facing camera to position coordinates on the corresponding see-through display;

determining a current spatial relationship between the outward facing cameras based on photogrammetry with respect to overlapping image data captured by the outward facing cameras and a scale based on a predetermined geometrical measurement in a field of view of the outward facing cameras; and updating a registration between a position of a real object and a position of a virtual object on at least one see-through display based on the determined current spatial relationship and the fixed spatial relationship of each outward facing camera with respect to its respective see-through display.

15. The one or more processor readable storage devices of claim 14 wherein determining the current spatial relationship between the outward facing cameras based on photogrammetry with respect to overlapping image data captured by the outward facing cameras and a scale based on a predetermined geometrical measurement in a field of view of the displays further comprises:

identifying one or more predetermined lengths in image data captured by the outward facing cameras;

determining a current scale for the image data based on the one or more predetermined lengths;

determining the current spatial relationship based on photogrammetry using triangulation based on image data including overlapping image data from the outward facing cameras; and determining any translation change and any rotation change of each camera based on a change of the current spatial relationship from the second spatial relationship.

16. The one or more processor readable storage devices of claim 15 wherein automatically detecting a change in a second spatial relationship between outward facing cameras supported by the head mounted, mixed reality display system further comprises:

performing a calibration check based on triangulation with respect to overlapping image data captured by the outward facing cameras; and determining whether the calibration check indicates a change in the second spatial relationship between the outward facing cameras.

17. The one or more processor readable storage devices of claim 14 wherein updating a registration between a position of a real object and a position of a virtual object on at least one display based on the current spatial relationship further comprises:

identifying a position of a real object to which a virtual object is registered on an image sensor of a respective outward facing camera;

mapping the position of the real object on the image sensor to a position in display coordinates on the corresponding display using the fixed mapping;

based on any translation change of the first spatial relationship between the cameras and motion sensor data for the respective outward facing camera, determining the translation change for the respective outward camera in a coordinate system for the position of the display;

adjusting the display coordinates of the real object in one or more directions to accommodate for movement of the display by the translation change for the respective outward camera; and updating display coordinates of a virtual object registered to the real object based on the adjusted display coordinates of the real object.

18. The one or more processor readable storage devices of claim 14 wherein updating a registration between a position of a real object and a position of a virtual object on at least one display based on the current spatial relationship further comprises:

determining a rotation change for the respective outward camera based on any rotation change of the second spatial relationship between the cameras and motion sensor data for the respective outward facing camera;

determining a skew angle with respect to each axis defined in the coordinate system for the position of the display caused by the rotation change for the respective outward facing camera; and updating display coordinates of the virtual object registered to the real object based on the skew angles.

19. The one or more processor readable storage devices of claim 14 wherein the method further comprises selecting a real object as a calibration object based on depth image data by
   identifying a real object in an overlap area of depth image data having one or more edges which maintain size over a time period for the same focal length; and
   obtaining a length measurement of one or more edges of the real object in any of three dimensions.

20. The one or more processor readable storage devices of claim 14 wherein the method further comprises
   identifying one or more real objects in image data;
   performing pattern recognition for identifying whether any of the one or more real objects is a standard size object; and
   responsive to identifying a real object as a standard size object, selecting a predetermined length of the standard size object for use in determining the second spatial relationship.

* * * * *